United States Patent
Cybulski et al.

(10) Patent No.: US 8,438,687 B2
(45) Date of Patent: May 14, 2013

(54) HEATED FOOD PREPARATION SURFACE CLEANING SYSTEM

(75) Inventors: Eric R. Cybulski, Woodbury, MN (US); Arthur V. Lang, Maplewood, MN (US); Jacob J. Orak, Zurich-Albisriedem (CH); Adriana Paiva, Richmond, TX (US); Lowell C. Zeller, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1108 days.

(21) Appl. No.: 12/281,090

(22) PCT Filed: Mar. 9, 2007

(86) PCT No.: PCT/US2007/063638
§ 371 (c)(1),
(2), (4) Date: Feb. 24, 2009

(87) PCT Pub. No.: WO2007/106725
PCT Pub. Date: Sep. 20, 2007

(65) Prior Publication Data
US 2009/0188061 A1   Jul. 30, 2009

Related U.S. Application Data

(60) Provisional application No. 60/743,455, filed on Mar. 10, 2006.

(51) Int. Cl.
*A47L 13/08* (2006.01)
*A47L 13/10* (2006.01)
*A47L 17/00* (2006.01)

(52) U.S. Cl.
USPC ............ 15/111; 15/210.1; 15/229.11; 15/245

(58) Field of Classification Search ............... 15/111, 15/210.1, 236.01, 236.05, 236.06, 229.11, 15/229.13, 218, 218.1, 245
See application file for complete search history.

(56) References Cited

U.S. PATENT DOCUMENTS

| | | | |
|---|---|---|---|
| 856,188 A | 6/1907 | Lykken | |
| 1,553,915 A * | 9/1925 | Rix et al. | ...................... 15/220.4 |
| D176,156 S | 11/1955 | Racket | |
| 2,920,333 A | 1/1960 | Montague et al. | |
| 2,958,593 A | 11/1960 | Hoover et al. | |
| D244,345 S | 5/1977 | Poveromo | |

(Continued)

FOREIGN PATENT DOCUMENTS

| WO | WO 97/49326 | 12/1998 |
|---|---|---|
| WO | WO 2006/101866 A1 | 9/2006 |
| WO | WO 2007/106340 A2 | 9/2007 |

*Primary Examiner* — Randall Chin
(74) *Attorney, Agent, or Firm* — David B. Patchett

(57) ABSTRACT

A system for cleaning a hot food preparation includes a cleaning tool including a handle and a detachable base. The handle and detachable base comprise a polymeric material, where the melting point of the polymeric material in the handle is lower than the melting point of the polymeric material in the base. The system includes a scrubbing pad support member that is configured to engage and secure a scrubbing pad and connect the scrubbing pad to a handle or a base of a cleaning tool. The handle of the tool is constructed to be reused numerous times whereas the detachable accessories, e.g., the scrubbing pad support member and/or a scrubbing pad, are disposable. A method of molding the scrubbing pad support member is also provided.

3 Claims, 19 Drawing Sheets

U.S. PATENT DOCUMENTS

| | | | | |
|---|---|---|---|---|
| 4,056,863 | A | 11/1977 | Gunjian | |
| 4,071,983 | A | 2/1978 | Thielen | |
| 4,146,943 | A | 4/1979 | Wertheimer et al. | |
| 4,148,318 | A | 4/1979 | Meyer | |
| 4,227,350 | A | 10/1980 | Fitzer | |
| 4,516,870 | A | 5/1985 | Nakazato | |
| D283,743 | S | 5/1986 | Moser | |
| 4,668,302 | A | 5/1987 | Kolodziej et al. | |
| D302,780 | S | 8/1989 | Himbert et al. | |
| 4,927,283 | A | 5/1990 | Fitjer | |
| D310,754 | S | 9/1990 | Gingras | |
| D324,901 | S | 3/1992 | Bonnell | |
| 5,255,406 | A | 10/1993 | Rood | |
| 5,373,600 | A | 12/1994 | Stojanovski et al. | |
| 5,412,829 | A * | 5/1995 | Hefner | 15/52.1 |
| 5,520,430 | A | 5/1996 | Clark, Jr. | |
| D388,571 | S | 12/1997 | Campbell | |
| 5,720,071 | A * | 2/1998 | Hall | 15/236.08 |
| 6,023,810 | A * | 2/2000 | Gessert | 15/229.13 |
| 6,039,372 | A | 3/2000 | Noe et al. | |
| 6,216,306 | B1 | 4/2001 | Esterson et al. | |
| 6,263,578 | B1 | 7/2001 | Frantz et al. | |
| 6,276,023 | B1 * | 8/2001 | Grundy | 15/244.1 |
| D451,287 | S | 12/2001 | Ingram | |
| D453,251 | S | 1/2002 | Gringer et al. | |
| D453,599 | S | 2/2002 | Backman et al. | |
| 6,351,887 | B1 | 3/2002 | Hurst | |
| D462,179 | S | 9/2002 | Lai et al. | |
| 6,443,646 | B1 | 9/2002 | MacDonald | |
| D464,861 | S | 10/2002 | Chen | |
| D468,909 | S | 1/2003 | Libman et al. | |
| D470,985 | S | 2/2003 | Zemel | |
| D479,375 | S | 9/2003 | Gringer et al. | |
| 6,629,331 | B2 | 10/2003 | Panfili et al. | |
| D482,874 | S | 12/2003 | Dotterman | |
| D484,705 | S | 1/2004 | Dotterman et al. | |
| 6,745,428 | B2 * | 6/2004 | MacLean | 15/111 |
| 6,757,928 | B2 * | 7/2004 | Lee | 15/104.001 |
| D493,692 | S | 8/2004 | Vito et al. | |
| D496,512 | S | 9/2004 | Treacy | |
| D502,002 | S | 2/2005 | Conway et al. | |
| D502,324 | S | 3/2005 | Conway et al. | |
| 6,871,377 | B2 | 3/2005 | Veltrop et al. | |
| D509,033 | S | 8/2005 | Dotterman et al. | |
| D511,626 | S | 11/2005 | Hay et al. | |
| 6,966,094 | B1 | 11/2005 | Rigakos | |
| D513,127 | S | 12/2005 | Hay et al. | |
| D516,895 | S | 3/2006 | Minkler et al. | |
| D524,499 | S | 7/2006 | Dotterman et al. | |
| 7,086,117 | B2 * | 8/2006 | Lann | 15/236.07 |
| D527,855 | S | 9/2006 | Williams | |
| 2005/0011029 | A1 * | 1/2005 | Yu | 15/111 |
| 2006/0021175 | A1 * | 2/2006 | Peroni | 15/236.02 |
| 2006/0207042 | A1 * | 9/2006 | Di Paolo | 15/111 |

* cited by examiner

HEATED FOOD PREPARATION SURFACE CLEANING SYSTEM

CROSS REFERENCE TO RELATED APPLICATIONS

This application is a national stage filing under 35 U.S.C. 371 of PCT/US2007/063638, filed Mar. 9, 2007, which claims priority to U.S. Application No. 60/743,455, filed Mar. 10, 2006, the disclosures of which are incorporated by reference in their entirety herein.

TECHNICAL FIELD

This invention relates to a method and a device for cleaning griddles using disposable scrubbing pads.

BACKGROUND OF THE INVENTION

Restaurants commonly have one or more griddle surfaces that provide a flat, hot cooking surface for cooking food items. Often restaurants include both a flat griddle to cook foods such as eggs and pancakes and a grooved griddle to cook meats and other items where a charbroiled or grilled appearance is desirable. In addition to the aesthetic appeal associated with food cooked over a grooved griddle, the grooved griddle is preferable over a flat griddle when draining fat out of meat products while cooking the meat is desirable. When cooking meat products on a grooved griddle, the meat product rests on raised ridges of the griddle. As the meat product cooks, some of the fat therein drains from the meat and collects on the lower surfaces of the griddle that are positioned between the raised ridges on the griddle. Though traditional open flame grills also enable fat to drain from meat products while the meat is cooking, grooved griddles are sometimes preferred over traditional open flame grills because they are typically more energy efficient, the temperature of the cooking surface can be more easily controlled, and they are generally more conducive to inside cooking.

Cleaning tools have been developed to remove the buildup of grease and food particles on griddles and open flame grills. Exemplary tools are disclosed in U.S. Pat. No. 6,966,094 to Rigakos; U.S. Pat. No. 6,871,377 to Veltrop et al; U.S. Pat. No. 6,443,646 to MacDonald; U.S. Pat. No. 6,351,887 to Hurst; U.S. Pat. No. 6,263,578 to Frantz et al.; U.S. Pat. No. 6,216,306 to Esterson et al.; U.S. Pat. No. 6,039,372 to Noe et al.; U.S. Pat. No. 5,373,600 to Stojanovski et al.; U.S. Pat. No. 5,255,406 to Rood; U.S. Pat. No. 4,668,302 to Kolodziej et al.; U.S. Pat. No. 4,516,870 to Nakozato; U.S. Pat. No. 4,146,943 to Werthermer et al.; U.S. Pat. No. 4,071,983 to Thielen; U.S. Pat. No. 4,056,863 to Gunjian; and U.S. Pat. No. D470,985 to Zemel. Known tools are not particularly well suited for cleaning grooved griddles of various geometric configurations.

Grooved griddles are difficult to clean with tools specifically designed to clean flat griddles or grills. Typically, such tools have problems cleaning the area between the ridges of the griddle. Known tools for cleaning specific types of grooved griddles are often less than fully effective because griddles are not uniform in size or geometric configuration. In addition, known tools often require the user to be positioned too close to the hot griddle surface. Moreover, the useful life and versatility of the entire tool is typically limited by the cleaning element of the tool. Accordingly, there is a need for improved cleaning devices that enable a user to clean a grooved griddle more efficiently and effectively.

SUMMARY OF THE INVENTION

According to one object of the invention a griddle cleaning tool is provided. The tool is constructed such that the accessories are detachable to facilitate the use of a single tool to clean both grooved and flat griddles. According to another embodiment of the invention a cleaning system is provided that is comprised of different materials. In particular, the handle and attachment accessories are of different materials. In another embodiment of the invention the tool includes accessories that are particularly advantageous for cleaning grooved griddles.

DETAILED DESCRIPTION OF THE INVENTION

Figure 23:
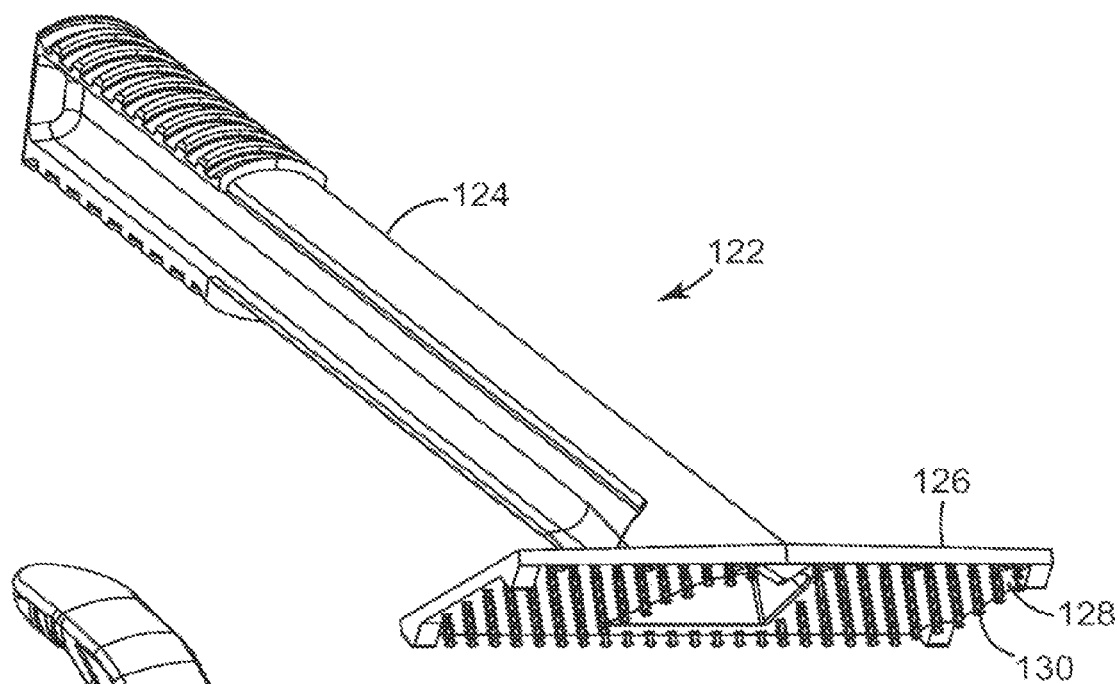
FIG. 23 is a bottom perspective view of a griddle cleaning tool.

Referring to FIG. 23, a prior art griddle cleaning tool 122 is shown. The griddle cleaning tool 122 includes a handle 124 that is molded integral with a pad support member 126. The pad support member 126 includes a bottom surface 128 that includes a plurality of hooks 130 that are constructed to engage and secure a scrubbing pad (not shown). The scrubbing pads can be, for example, 3M's commercially available Scotch-Brite Griddle cleaning and polishing pads. The hooks 130 of griddle cleaning tool 122 are positioned in a horizontal plane. Accordingly, the griddle cleaning tool 122 works for cleaning flat griddles but is not configured to efficiently and effectively clean griddles with grooved surfaces. Since many restaurants have both a flat and a grooved griddle, there is a need in the art for a griddle tool that can be used to clean both flat and grooved griddle surfaces.

Moreover, the useful life of the griddle cleaning tool 122 is typically limited by the durability of the hooks 130. Once a certain number of the hooks 130 break, bend, or melt, the entire griddle cleaning tool 122 is rendered ineffective because scrubbing pads can no longer be conveniently attached thereto. Due to environmental and cost issues, there is a need in the art for a griddle cleaning device wherein the useful life of the entire tool is not limited by the durability of the hooks, or any other component part that have a relatively short useful lifespan relative to other parts of the tool (e.g., the handle 124). This need is met by some embodiments of the invention. In addition, there is a need for a griddle tool wherein the material used to construct the body of the tool and the material used to construct the pad support member are different materials with the material used to construct the pad support member being more heat resistant than the material used to construct the body of the tool. This need is met by some embodiments of the invention. In such embodiments the feature promotes efficiency as the material chosen to construct each part of the tool is the more likely material that best suits the environmental and functional needs of the particular part. For example, the handle 124 can be constructed of a strong, durable material that is not as heat resistant as the pad support member 126, and the pad support member can be constructed of a material that is better able to withstand high temperatures as it is subject to higher temperatures while in use than compared to the handle 124.

Figure 1:
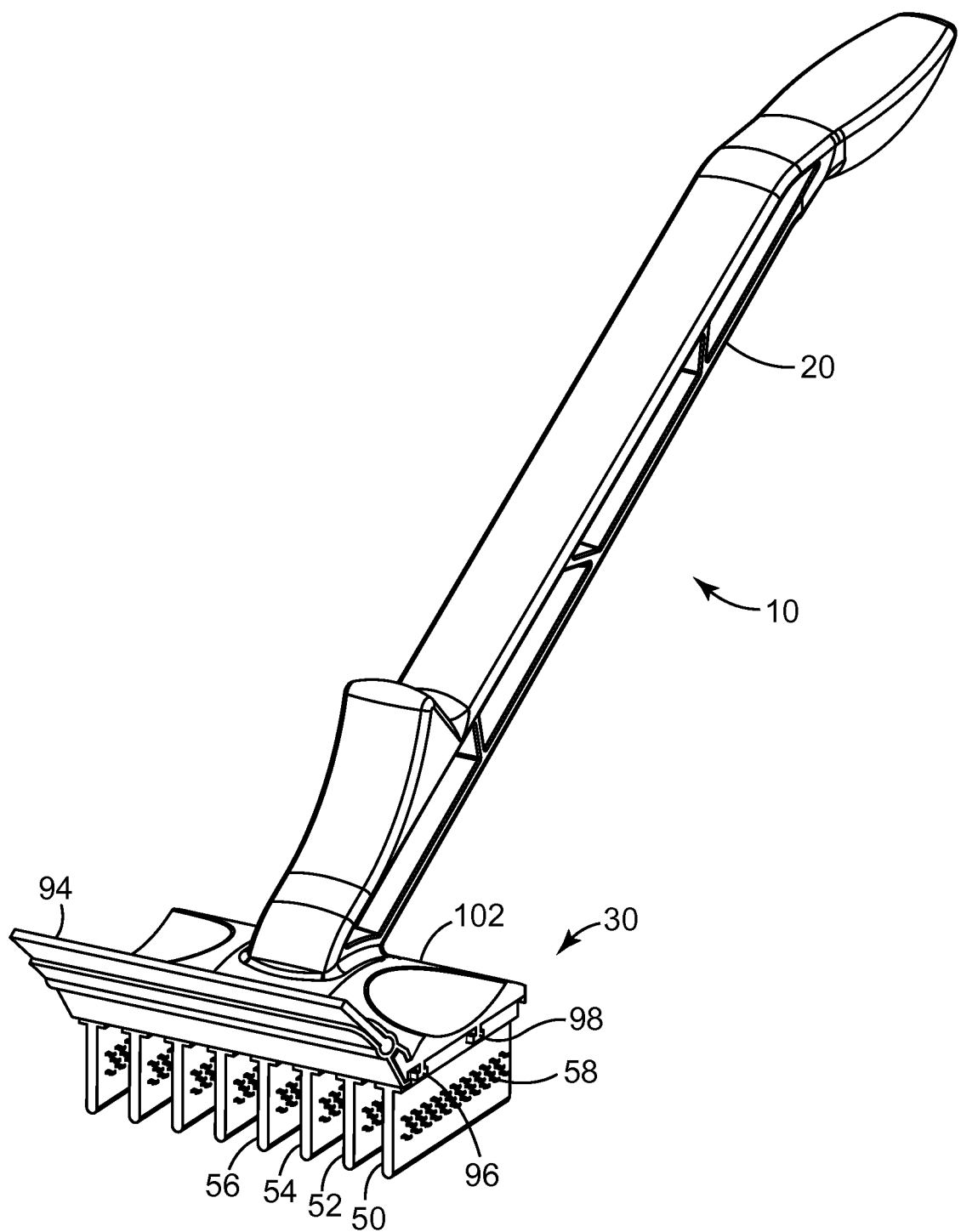
FIG. 1 is a perspective view of a griddle cleaning tool according to an embodiment of the invention.
Figure 2:
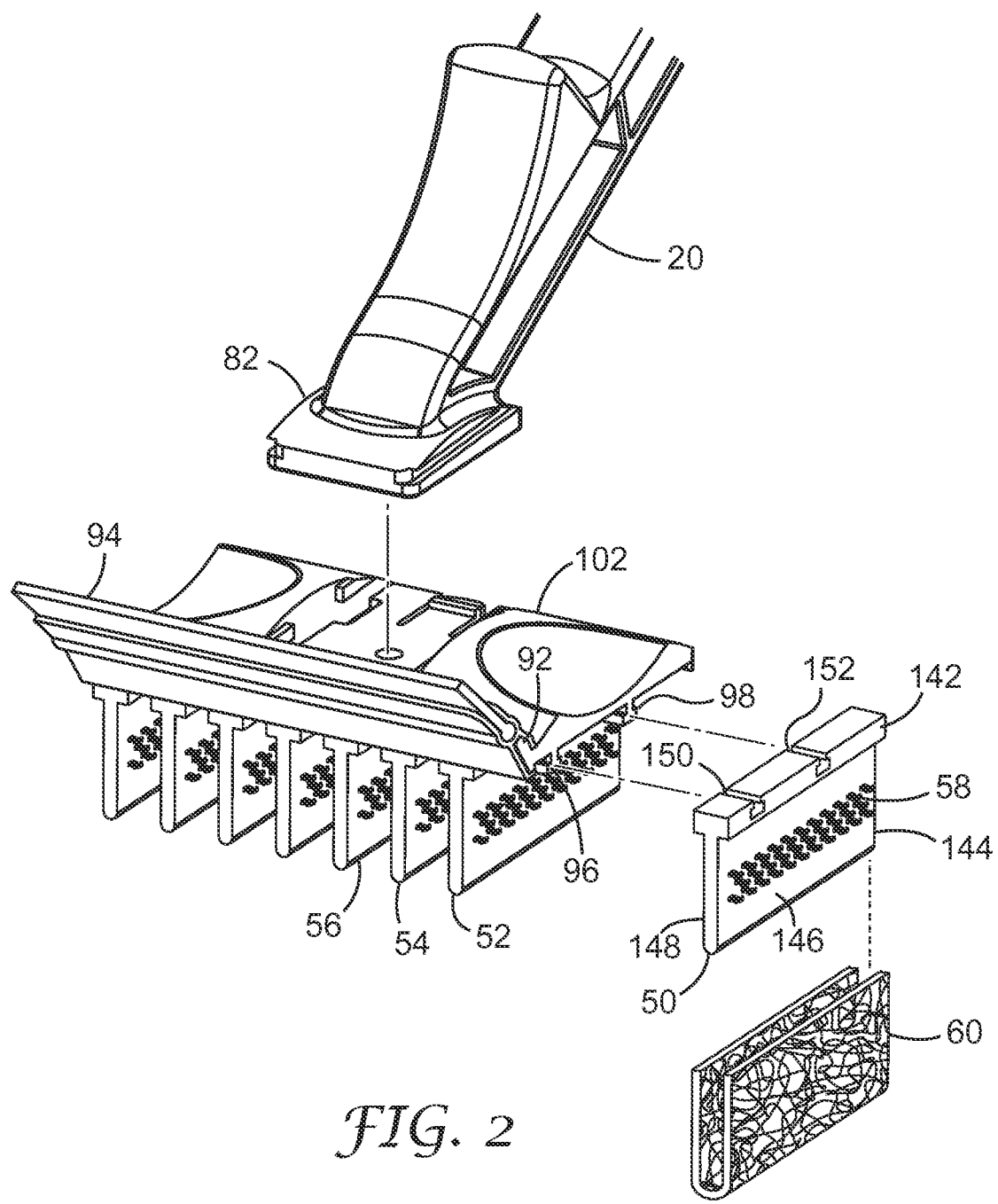
FIG. 2 is a partially exploded view of a lower portion of the embodiment shown in FIG. 1.
Figure 3:
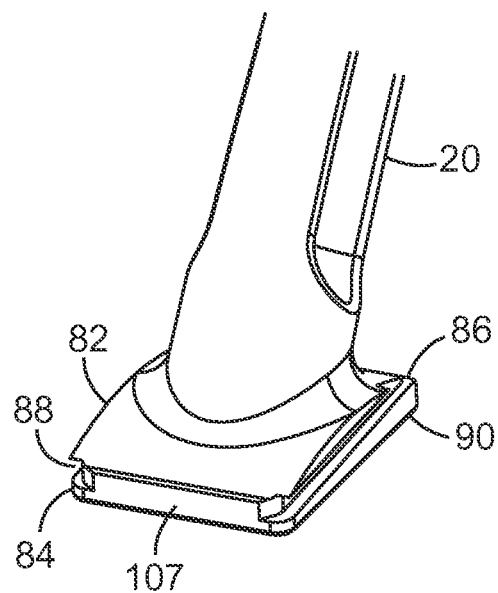
FIG. 3 is a front top perspective view of the foot shown in FIG. 1.
Figure 4:
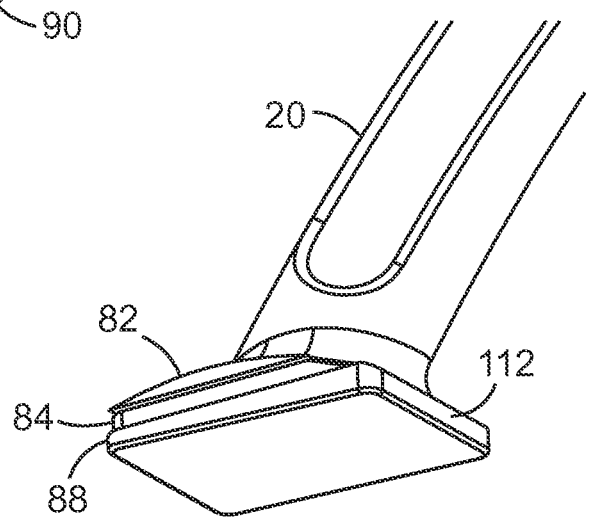
FIG. 4 is a rear bottom perspective view of the foot shown in FIG. 1.
Figure 5:
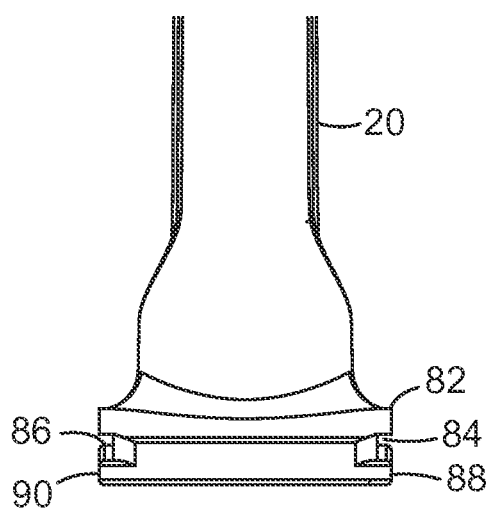
FIG. 5 is a front view of the foot shown in FIG. 1.
Figure 6:
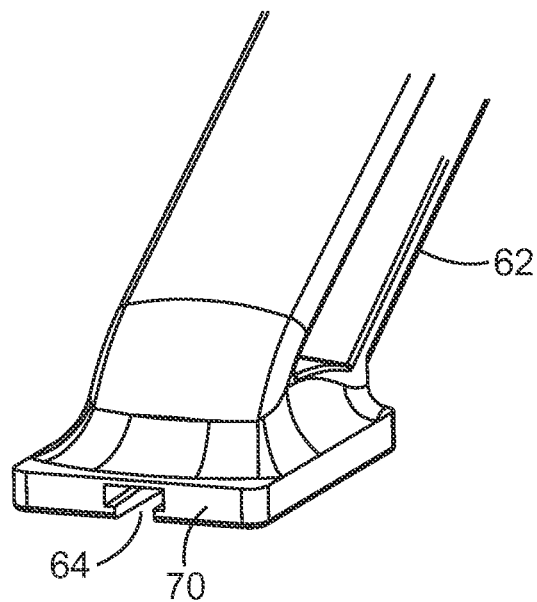
FIG. 6 is a front top perspective view of an alternative embodiment of the foot shown in FIG. 1.
Figure 7:
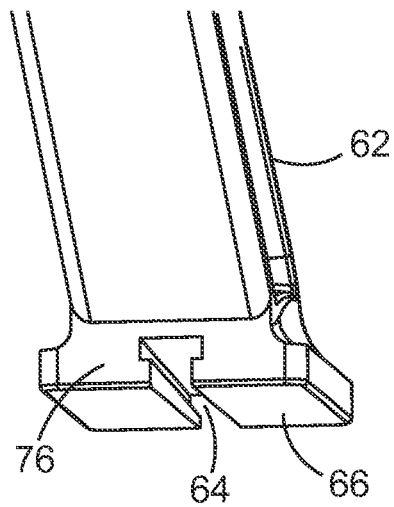
FIG. 7 is a rear bottom perspective view of the foot shown in FIG. 6.

Referring to FIGS. 1 and 2, a cleaning tool 10 embodying some of the principles of the present disclosure is shown. The depicted cleaning tool 10 includes a handle 20 and a removable attachment assembly 30. The removable attachment assembly 30 includes a shoe 102 that supports a plurality of pad supports 50, 52, 54, and 56. Each pad support 50, 52, 54, and 56 includes a plurality of hooks 58 constructed to releasably engage a disposable scrubbing pad 60 (shown in FIG. 2) and secure the pad 60 to the cleaning tool 10. The shoe 102 includes two parallel beams 96 and 98 that run along the bottom surface 100 of the shoe. The beams are T-shaped and are sized to mate with the pad support members 50, 52, 54, and 56. In the depicted embodiment, the pad support members 50, 52, 54, and 56 are held parallel to each other but are free to move along the beams 96 and 98 so that the tool 10 can adjust to work effectively and efficiently regardless of the particular spacing of the grooves on the grooved griddle. In the illustrated embodiment eight pad support members are shown. However, it should be understood that the shoe 102 could be configured to any number of pad support members, including none.

Figure 11:
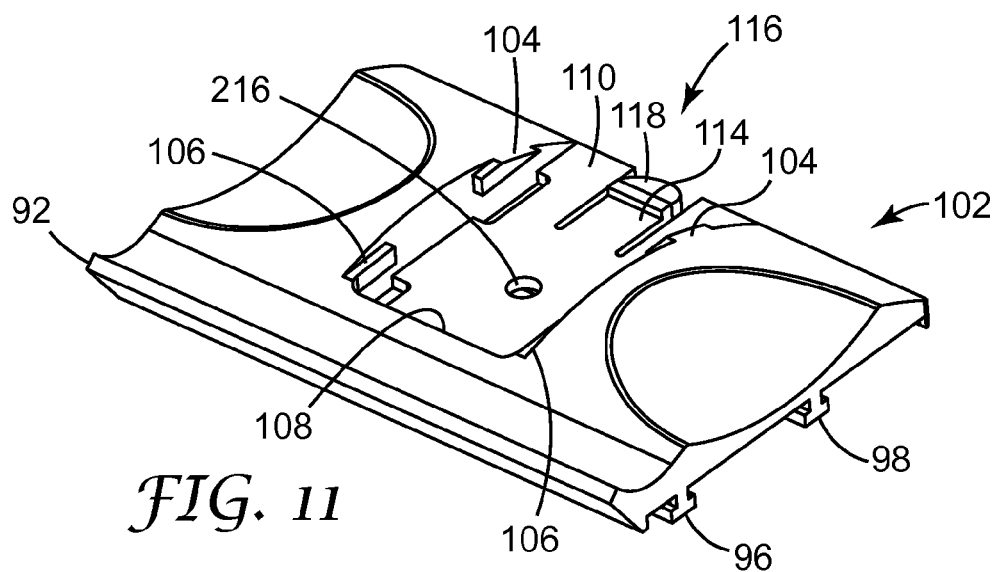
FIG. 11 is a top perspective view of the shoe shown in FIG. 1.
Figure 12:
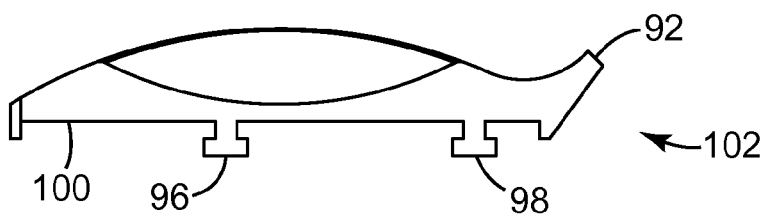
FIG. 12 is a side elevation view of the shoe shown in FIG. 1.
Figure 13:
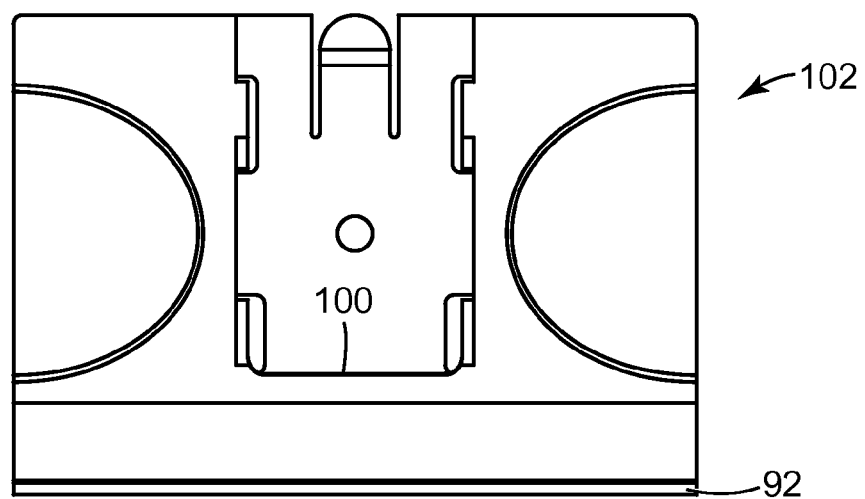
FIG. 13 is a top view of the shoe shown in FIG. 1.

Referring to FIGS. 1-5 and 11-13, the handle 20 includes a foot 82 that is constructed to mate with the shoe 102. The foot 82 shown includes two opposed channels 84 and 86 disposed on either side portions 88 and 90 of the foot 82. The channels 84 and 86 are sized to engage shoe 102. The shoe 102 includes a pair of rear bosses 104 and front bosses 106 that are constructed to engage the channels 84 and 86 (FIG. 11). When the handle 20 and the shoe 102 are engaged, the front portion 107 of the foot 82 abuts the front wall 108 of the foot receiving cavity 110. The back portion 112 of the foot 82 engages the locking ridge 114 of the locking member 116. To separate the foot 82 from the shoe 102 the tab 118 is depressed and the shoe 102 is slid away from the foot 82. In the depicted embodiment the shoe 102 further includes an aperture 216 because in some embodiments the handle 20 includes a reservoir that holds cleaning fluid. In such an embodiment the aperture 216 enables cleaning fluid to flow from the handle 20 through the shoe 102 to the surface of the griddle.

Still referring to FIGS. 1-5 and 11-13, the shoe 102 includes an edge 92. The edge 92 can be used for scraping a griddle by flipping the tool 10 upside down so that the tool 10 rides on the griddle along the edge 92. In the depicted embodiment the edge is constructed to support a squeegee 94 (FIGS. 1 and 2). The tool 10 can be used to conveniently remove cleaning fluids from a griddle by flipping the tool 10 upside down so that the tool 10 rides on the griddle along the squeegee 94. In an alternative embodiment the squeegee can be replaced by a metal scraping blade (not shown) to enable the tool 10 to be conveniently used to scrape grease and food material buildup off flat griddles. In some embodiments the shoe 102 is constructed of a material that is hard enough so that the edge 92 itself can be used as a scraping blade.

Figure 14:
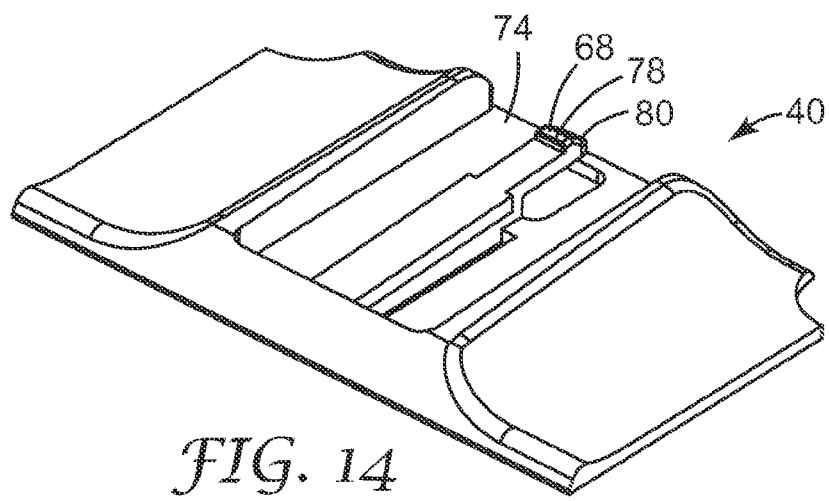
FIG. 14 is a top perspective view of an alternative embodiment of the shoe shown in FIG. 1.

Referring to FIGS. 6-7 and 14-16 alternative embodiments of the foot 82 and shoe 102 are shown. The foot 62 includes a T-shaped channel 64 that runs along the bottom surface 66 of the foot 62. The channel 64 is sized to receive the locking member 68, which also has a T-shaped cross section. The front portion 70 of the foot 62 abuts the front wall 72 of the foot receiving cavity 74 of the shoe 40 when the handle 20 is connected with the shoe 40 (FIG. 14). The back portion 76 of the foot 62 engages the locking ridge 78 of the locking member 68 when the handle 20 is connected with the shoe 40. To disconnect the shoe 40 from the foot 62, the tab 80 is depressed and the shoe 40 is slid away from the foot 62. To connect the shoe 40 with the foot 62 the locking member 68 of the shoe 40 is aligned with the channel 64 of the foot 62, and the shoe 40 and the foot 62 are slid together until the front portion 70 of the foot 62 engages the front wall 72 of the foot receiving cavity 74 and the locking ridge 78 snaps into contact with the back portion 76 of the foot 62. Though in the depicted embodiment the locking member has a T-shaped cross section, it should be appreciated that many other alternative geometric configurations are possible. For example, in an alternative embodiment the locking member may include a dovetail interlocking geometric configuration.

Figure 15:
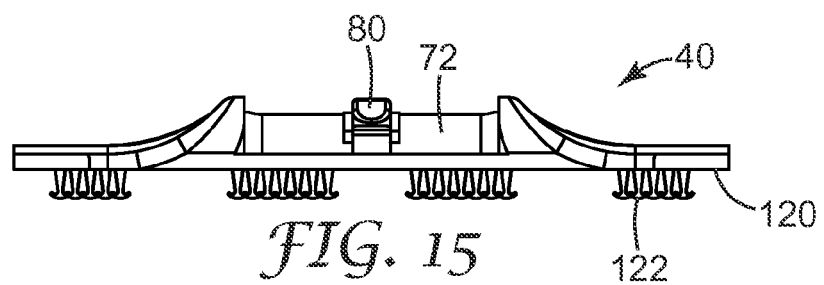
FIG. 15 is a back view of the shoe shown in FIG. 14.
Figure 16:
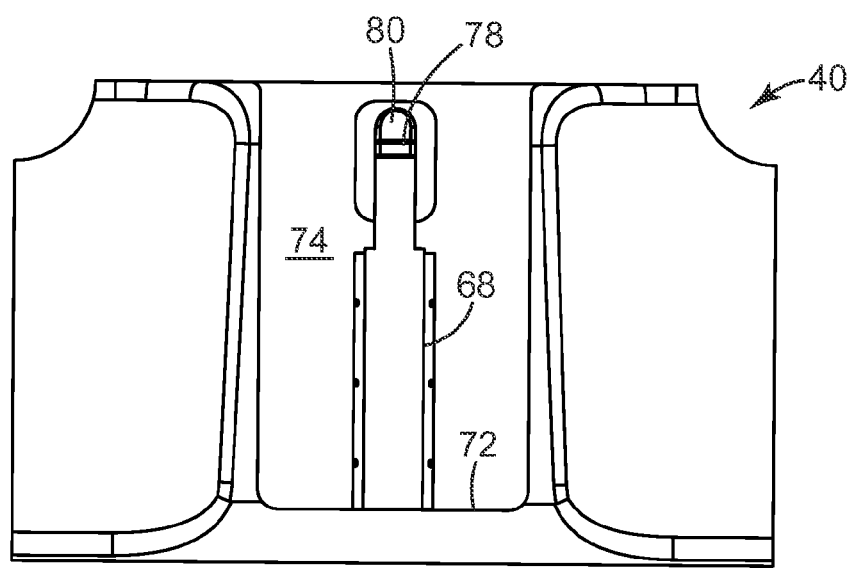
FIG. 16 is a top view of the shoe shown in FIG. 14.
Figure 17:
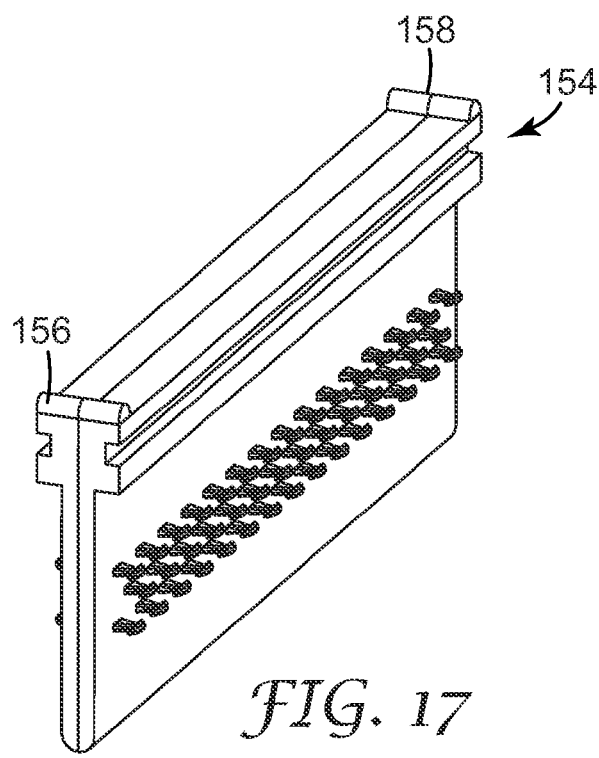
FIG. 17 is an alternative embodiment of the pad support element shown in FIG. 1.
Figure 18:
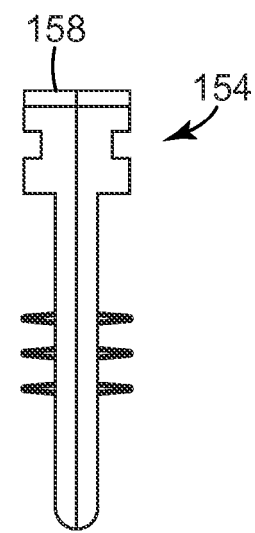
FIG. 18 is an end view of the pad support element shown in FIG. 17.

Referring particularly to FIG. 15, in the depicted embodiment the bottom surface 120 of the shoe 40 includes a plurality of hooks 122. The hooks 122 are constructed to engage and secure a scrubbing pad (not shown) on the bottom surface 120 of the shoe 40. The bottom surface 120 is shown to be a flat surface; therefore, this particular embodiment is particularly well suited for cleaning flat griddles. It should be understood that numerous other bottom surface configurations are possible.

Figure 8:
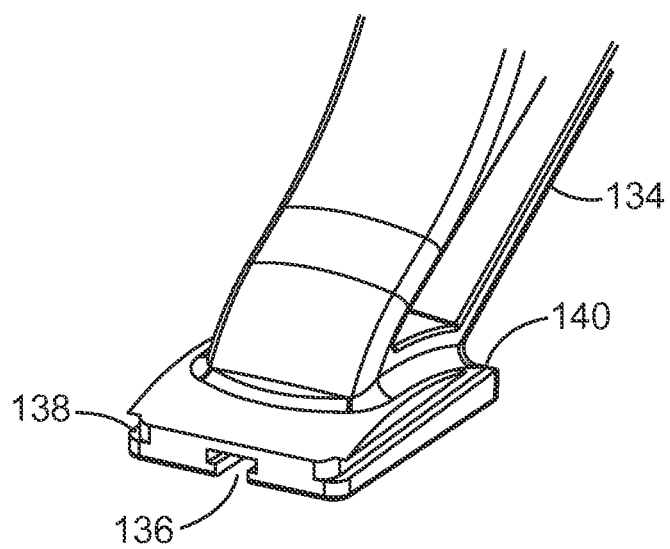
FIG. 8 is a front top perspective view of an alternative embodiment of the foot shown in FIG. 1.
Figure 9:
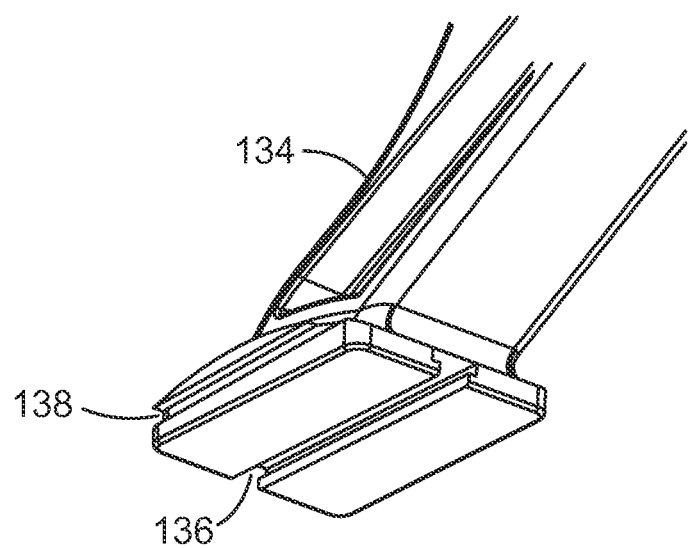
FIG. 9 is a rear bottom perspective view of the foot shown in FIG. 8.
Figure 10:
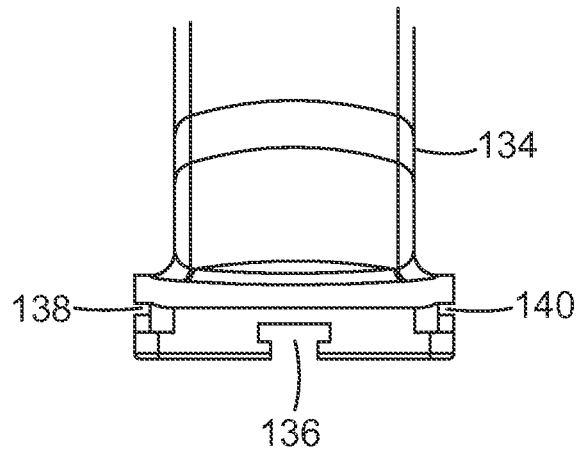
FIG. 10 is a front view of the foot shown in FIG. 8.

Referring to FIGS. 8-10, another alternative embodiment of the foot 62 is shown. The foot 134 includes a center channel 136 and two opposed side channels 138 and 140. The side channels 138 and 140 are similar to the side channels 84 and 86 of foot 82, and the center channel 136 is similar to the center channel 64 of foot 62. It should be understood that features from any of the alternative embodiments can be combined to form additional alternative embodiments. For example, the locking mechanism of the shoe 102 can be interchanged with the locking mechanism of shoe 40, and the bottom configuration of the shoe 102 can be interchanged with the bottom configuration of the shoe 40. Moreover, the shoe 40 may also include the squeegee attachment 94 shown in FIGS. 1 and 2.

Figure 39:
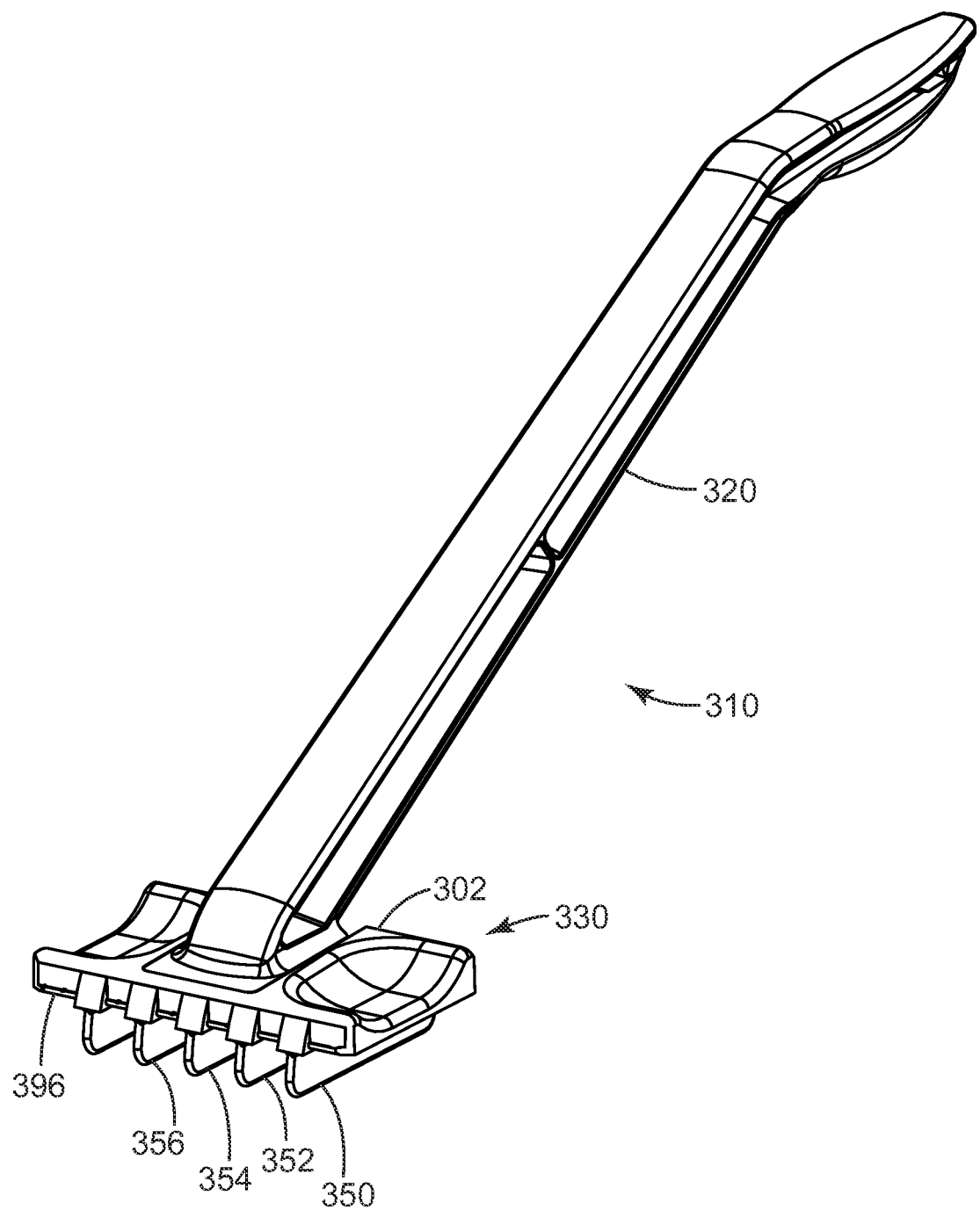
FIG. 39 is a perspective view of a griddle cleaning tool according to an alternative embodiment of the invention.
Figure 40:
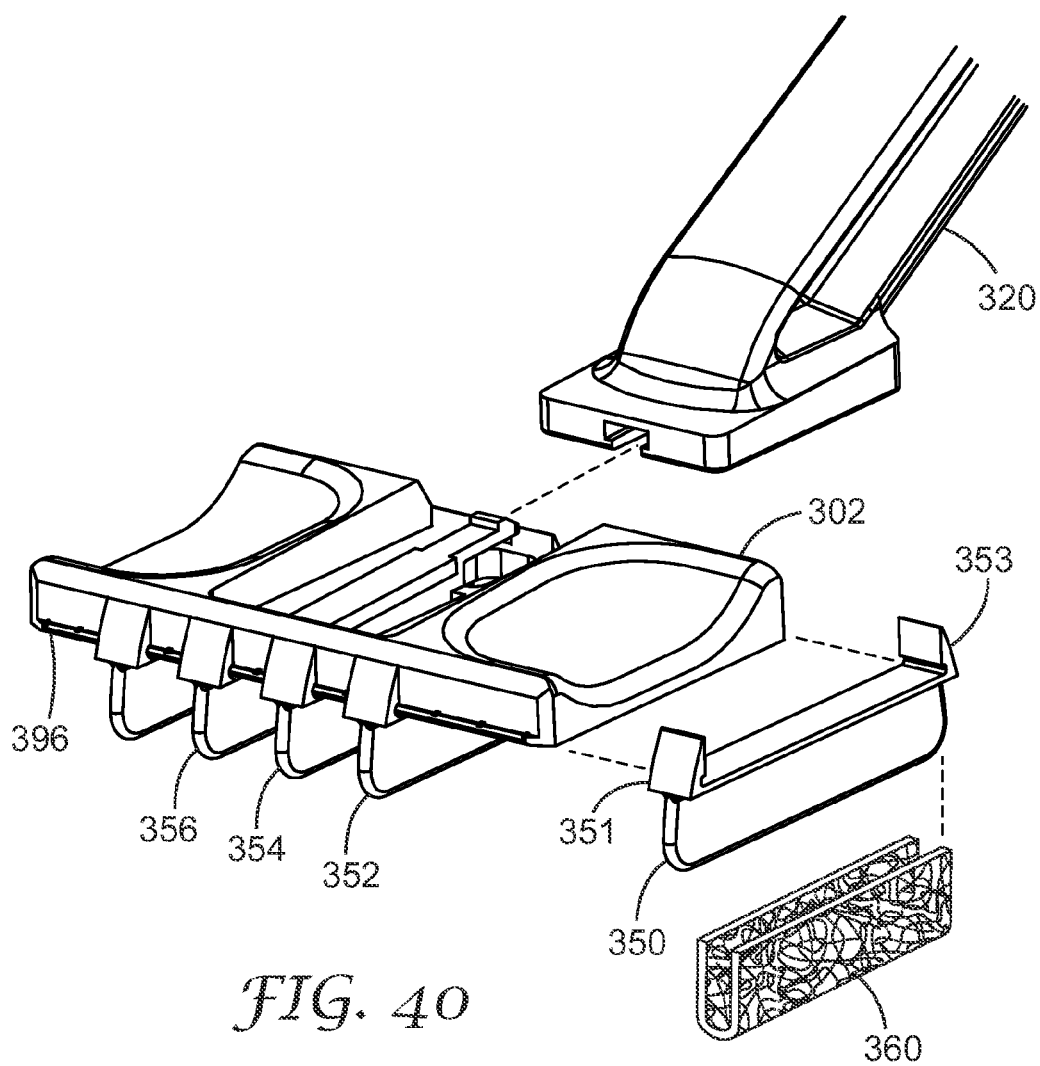
FIG. 40 is a partially exploded view of a lower portion of the embodiment shown in FIG. 39.
Figure 41:
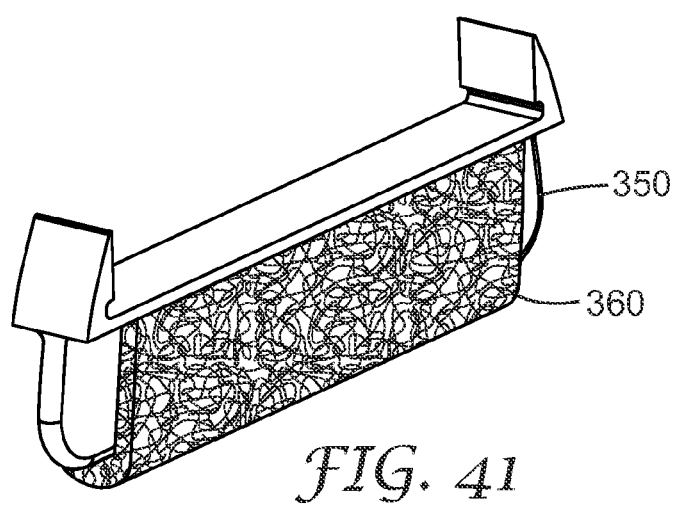
FIG. 41 is a perspective view of the pad support element of FIG. 39 connected to a pad.

Referring back to FIG. 2, the pad support member 50 is described in greater detail. The pad support member 50 includes a spine member 142 and a panel member 144 extending from the spine member 142. The panel member 144 includes three rows of hooks 58 that are disposed on the front surface 146 and back surface 148 of the panel member 144. It should be appreciated that any alternative number of arrangement of hooks are possible. The hooks 58 are constructed to secure scrubbing pads 60 to the panel member 144. Alternatively, the panels may include other features to secure the scrubbing pads 60 to the panel members, for example, the pad 60 could be heat staked to the pad support member 50, glued to the pad support member 50, or ultrasonic welded to the pad support member 50 (FIGS. 39-41 depict an embodiment where the pad support members and pads are not connected to each other via hooks).

As used herein, heat staking refers to a method of connecting components where protrusions (e.g., studs, ridges, posts) from a first component fits into an aperture in a second component. The protrusions are then deformed through the softening of the material (e.g., via heat, or ultrasonic energy) to form a head which mechanically locks the two components together. Heat staking is a particularly advantageous technique for joining different material types (e.g., plastic to metal). Ultrasonic welding/bonding as used herein refers to a technique whereby high-frequency ultrasonic acoustic vibrations are used to weld, join, or bond objects together. Ultrasonic welding of polymeric materials causes local melting of the materials due to absorption of vibration energy.

In the depicted embodiment, the pad support member 50 includes a pair of T-shaped cutouts 150 and 152 that are sized to mate with the beams 96 and 98 of the shoe 102. The T-shaped cutouts 150 and 152 hold the pad support member to the shoe 40 while allowing the distance between the pad support members 50, 52, 54, and 56 to be adjusted as needed.

Figure 19:
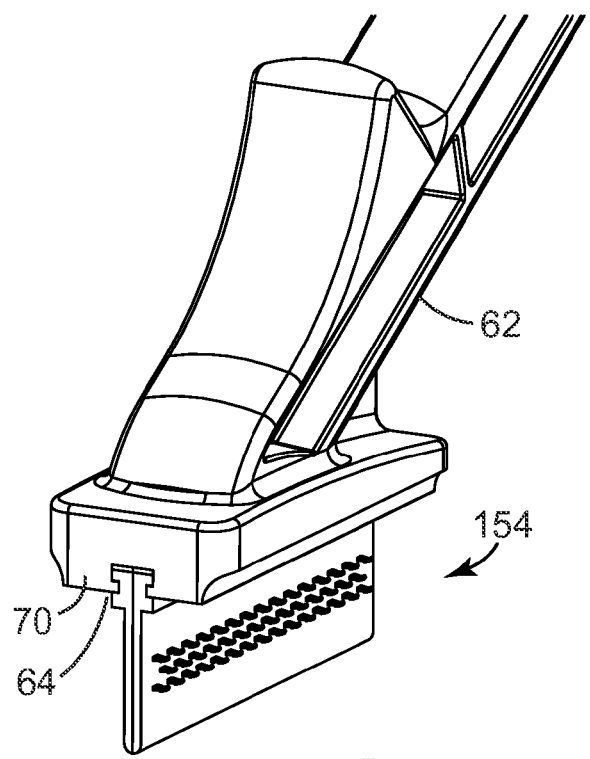
FIG. 19 is a perspective view of the pad support element shown in FIG. 17 connected to a foot.

Referring to FIGS. 17-22, an alternative embodiment of the pad support member 50 is shown. The pad support member 154 is constructed to directly connect to the foot 62. As shown in FIG. 19, the pad support member 154 mates with the foot 62 like the shoe 40 mates with the foot 62. The pad support member 154 is aligned with the channel 64 in the foot 62 and slid onto the foot 62 until the stop 156 on the pad support member 154 engages the front portion 70 of the foot 62 and the locking tab 158 of the pad support member 154 engages the back portion 76 of the foot 62. In the embodiment shown the locking tab has a triangular profile such that the tab 158 can slide into engagement with the channel 64 without manually depressing the tab 158, but the tab 158 must manually be depressed to detach the pad support member 154 from the foot 62.

Still referring to FIGS. 17-22, a method of manufacturing the pad support member 154 is illustrated. In the depicted embodiment the pad support member is molded from continuous polymeric material having a heat deflection temperature of greater than 150 degrees Celsius at 0.46 MPa. For example, the material may be a type of nylon. In contrast the handles can be molded from continuous polymeric material having a heat deflection temperature of less than 150 degrees Celsius at 0.46 MPa. The deflection temperature is also known as the 'deflection temperature under load' (DTUL), 'heat deflection temperature', or 'heat distortion temperature' (HDT). The two common loads used are 0.46 MPa (66 psi) and 1.8 MPa (264 psi). The common ASTM test is ASTM D 648 while the analogous ISO test is ISO 75. The test using a 0.46 MPa load is performed under ISO 75 Method B. For example, such material may include HIPS (high impact polystyrene), ABS (acrylonitrile-butadiene-styrene terpolymer), or poly(phenyline oxide), (polyamide), or any combination thereof. As used herein, the term HIPS refers to a material that includes at least some grafted polystyrene-polybutadiene molecules therein (i.e., polybutadiene copolymerizing with the styrene monomer). HIPS is capable of taking harder impacts without breaking than regular polystyrene. In one embodiment the melting point temperature of the handle is less than 210 degrees Celsius. In another embodiment the melting point temperature of the handle is less than 175 degrees Celsius. In yet another embodiment the shoe has a melting point temperature greater than 210 degrees Celsius. It should be understood that, alternatively, any number of other types of material can be used to construct the griddle cleaning tool, including wood, metal, and paper products. In embodiments where the pad support member is molded it may be, for example, extruded or injection molded. Examples of some specific commercially available materials for construction of the handle include Dow AIM® 4900, Zytel®, and Ultramid® A3K. Dow AIM® 4900 High Impact Styrenic Resin is a styrenic resin for extrusion and thermoforming applications for food contact articles. AIM® 4900 has a tensile strength of 15.9 MPa (ultimate) and 22.1 MPa (yield), tensile modulus of 1.79 GPa, Impact Test 23.7J, CTE, linear 20 degrees C., and Vicat Softing Point 101 degrees C. Dupont's Zytel® nylon resin has a tensile strength of 83 MPa (yield), flexural modulus of 2830 MPa, Heat Deflection temperature of 210 degrees C., and melting point of 262 degrees C. Ultramid® A3K has a tensile strength of 527 MPa (yield), flexural modulus of 178 MPa, and melting point of 3146 degrees C. Numerous other commercially available materials can also be used.

Further, any material with suitable chemical and physical characteristics (e.g., flexural strength or modulus, melting point) may be employed. In some embodiments, materials with melting points of greater than 150 degrees F. and flexural modulus of 250000 psi can be used to form portions of the pad support members such as the handle. In some embodiments material with melting points of over 350 degrees F. and flexural modulus of 140000 psi can be used to form portions of the pad support members such as the accessories.

Figure 20:
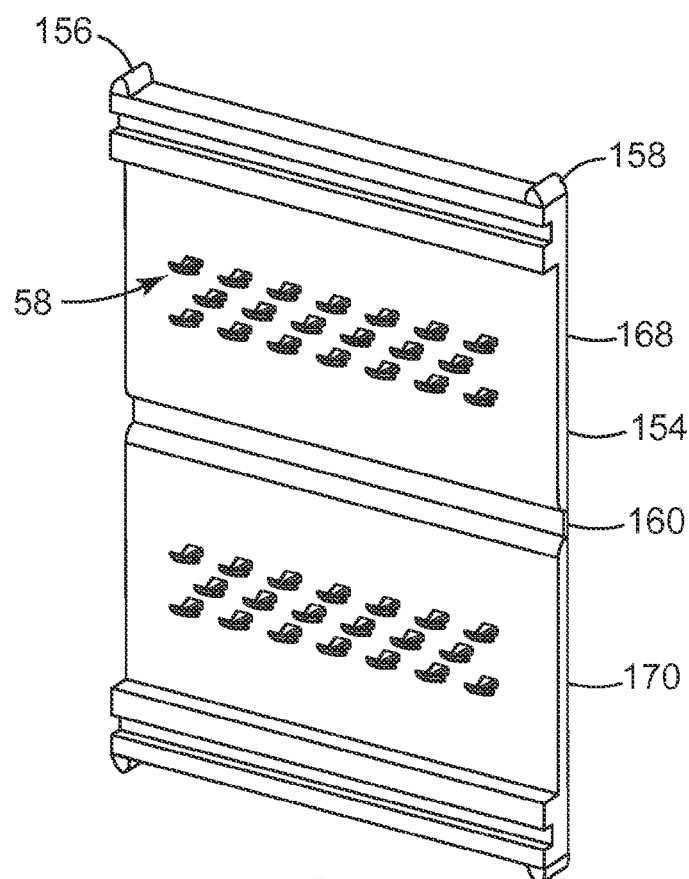
FIG. 20 is a perspective view on the pad support element prior to folding.
Figure 21:
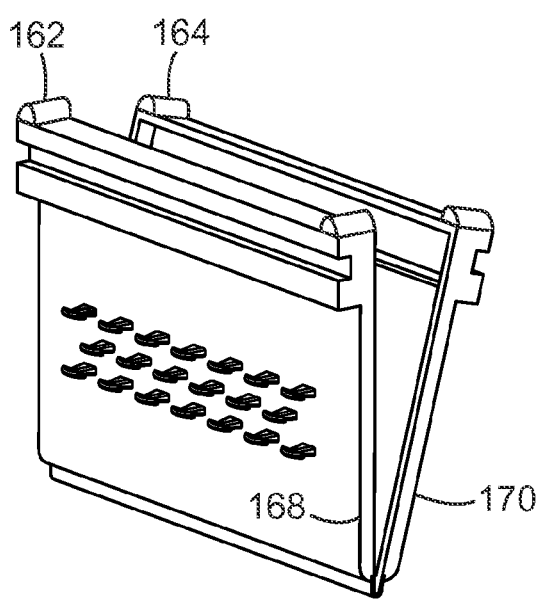
FIG. 21 is a perspective view on the pad support element being folded.
Figure 22:
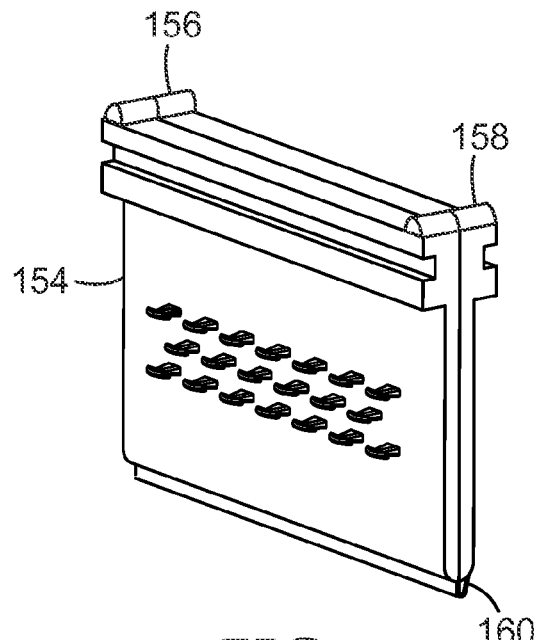
FIG. 22 is a perspective view on the pad support element completely folded.

As shown in FIG. 20, preferably during the molding process all of the hooks 58 are in the same plane. As shown in FIGS. 21-22, after the part is removed from the mold the pad support member 154 is folded about a living hinge 160 until the ends 162 and 164 abut each other and form a shape that fits within the channel 64 of the foot 62. In the depicted embodiment the periphery edge of the molded part is bonded together to form an enclosed final part with a hollow cavity therein. In an alternative embodiment the periphery edge can remain detached so that the first half 168 and the second half 170 of the part are normally biased away from each other as a result of the living hinge 160 arrangement. In such embodiments, the first half 168 and the second half 170 of the pad support member 154 are manually held together so that the pad support member 154 fits within the channel 64.

In an alternative embodiment the pad support member 50 and the pad 60 can be formed together as a single unit. In such an embodiment the pad support member 50 and pad 60 combination could be disposable. As discussed above, in other alternative embodiments the pad support members do not include hooks and are instead connected to the pad via other means including heat staking, ultrasonic welding, and gluing.

Figure 24:
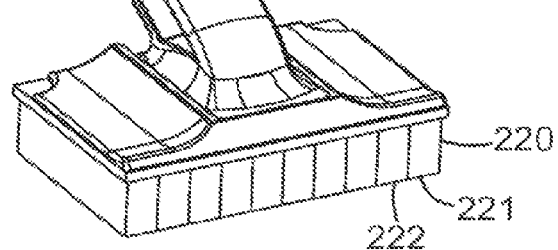
FIG. 24 is a perspective view of an alternative embodiment of the griddle cleaning tool shown in FIG. 1.
Figure 25:
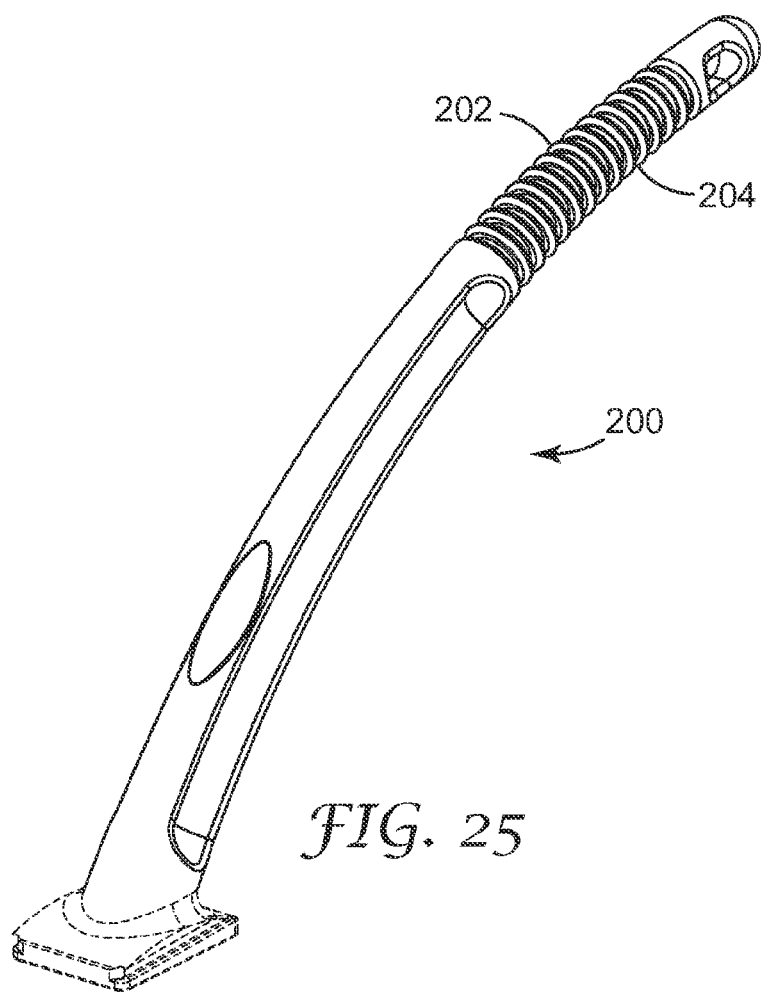
FIG. 25 is a top perspective view of an alternative embodiment of a handle shown in FIG. 1.
Figure 26:
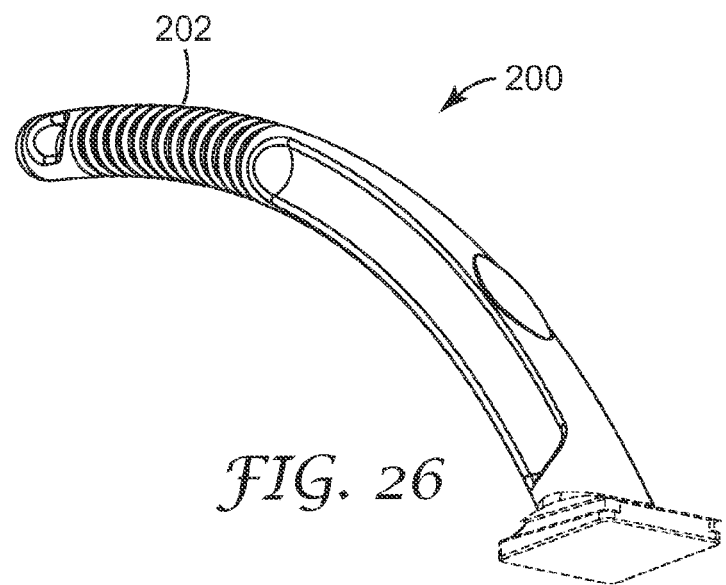
FIG. 26 is a bottom perspective view of an alternative embodiment of a handle shown in FIG. 25.
Figure 27:
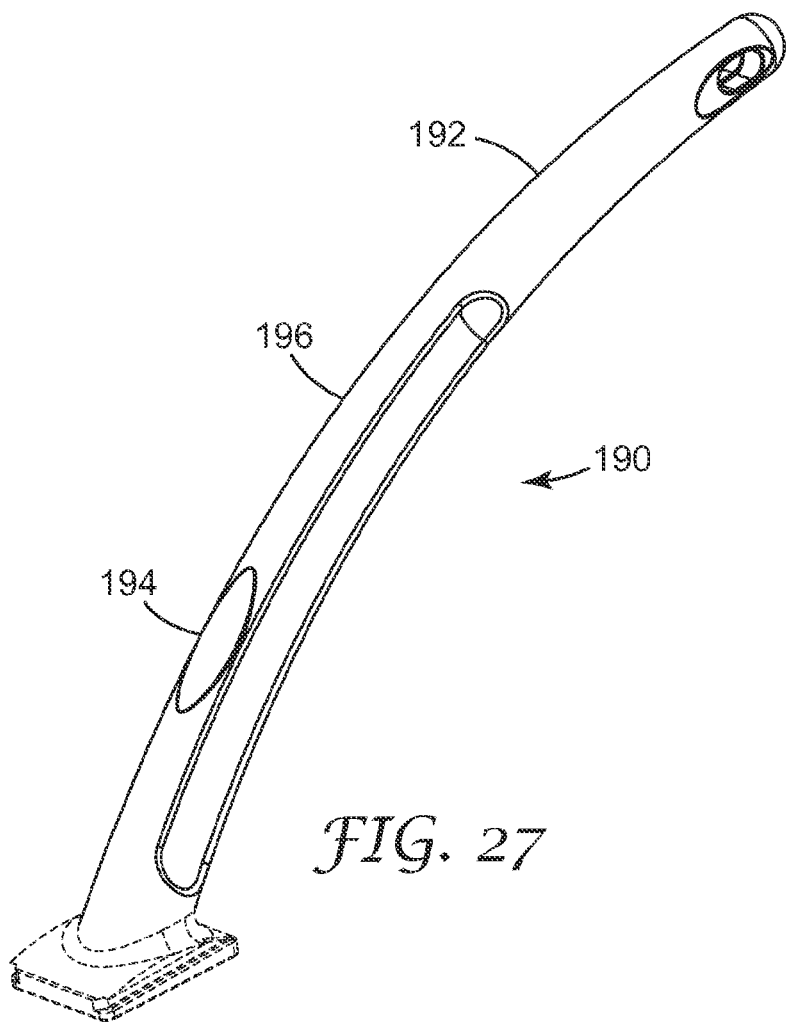
FIG. 27 is a top perspective view of an alternative embodiment of a handle shown in FIG. 1.
Figure 28:
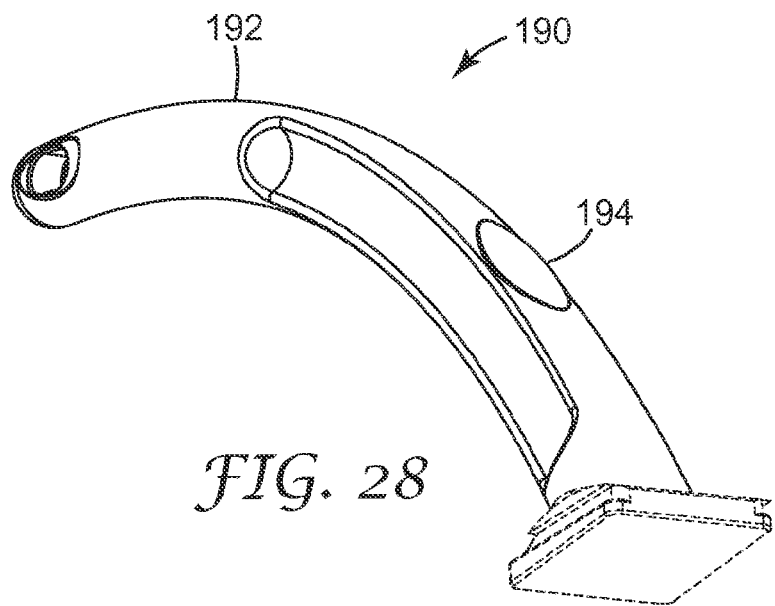
FIG. 28 is a bottom perspective view of an alternative embodiment of a handle shown in FIG. 27.
Figure 29:
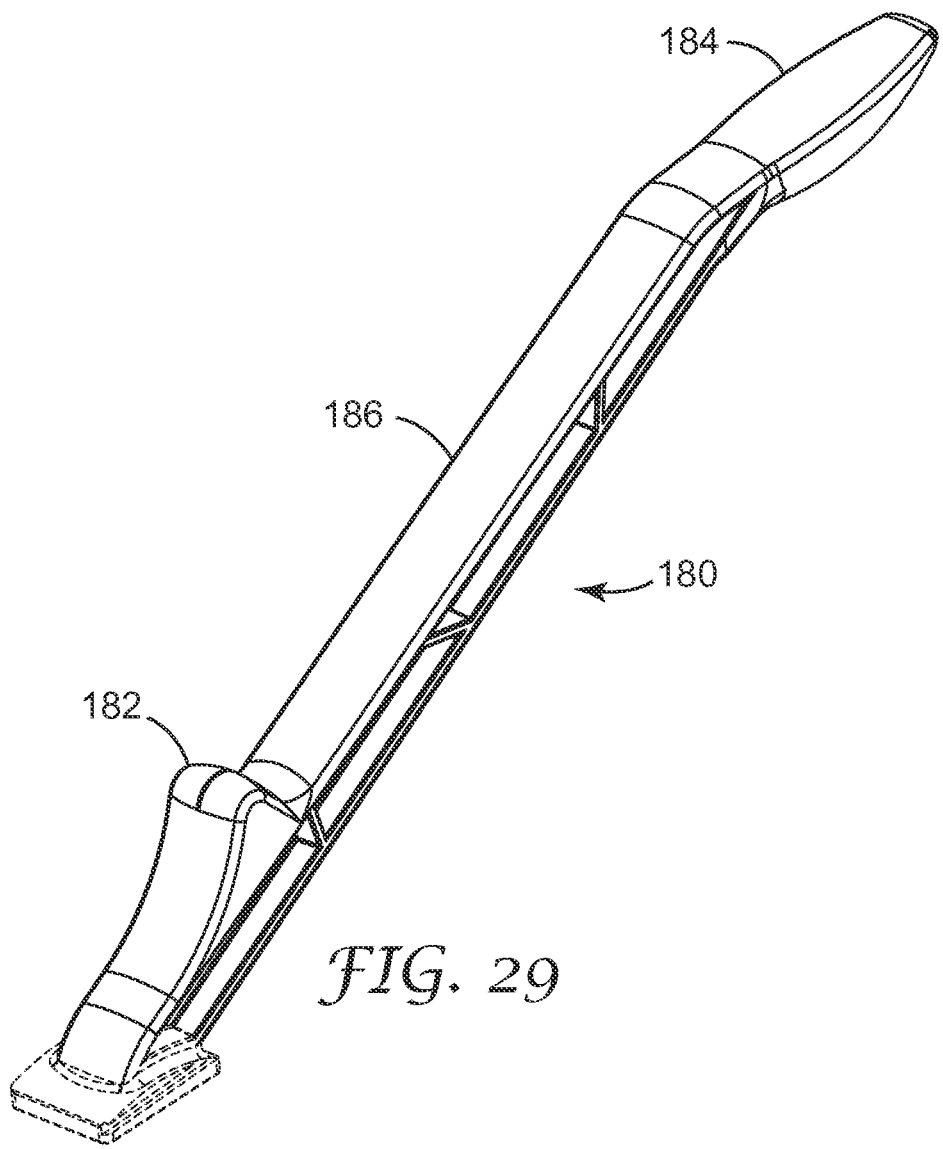
FIG. 29 is a top perspective view of the handle shown in FIG. 1.
Figure 30:
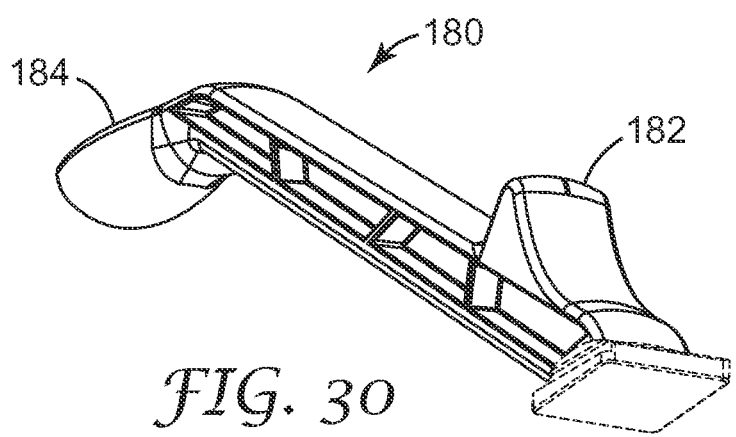
FIG. 30 is a bottom perspective view of the handle shown in FIG. 1.
Figure 31:
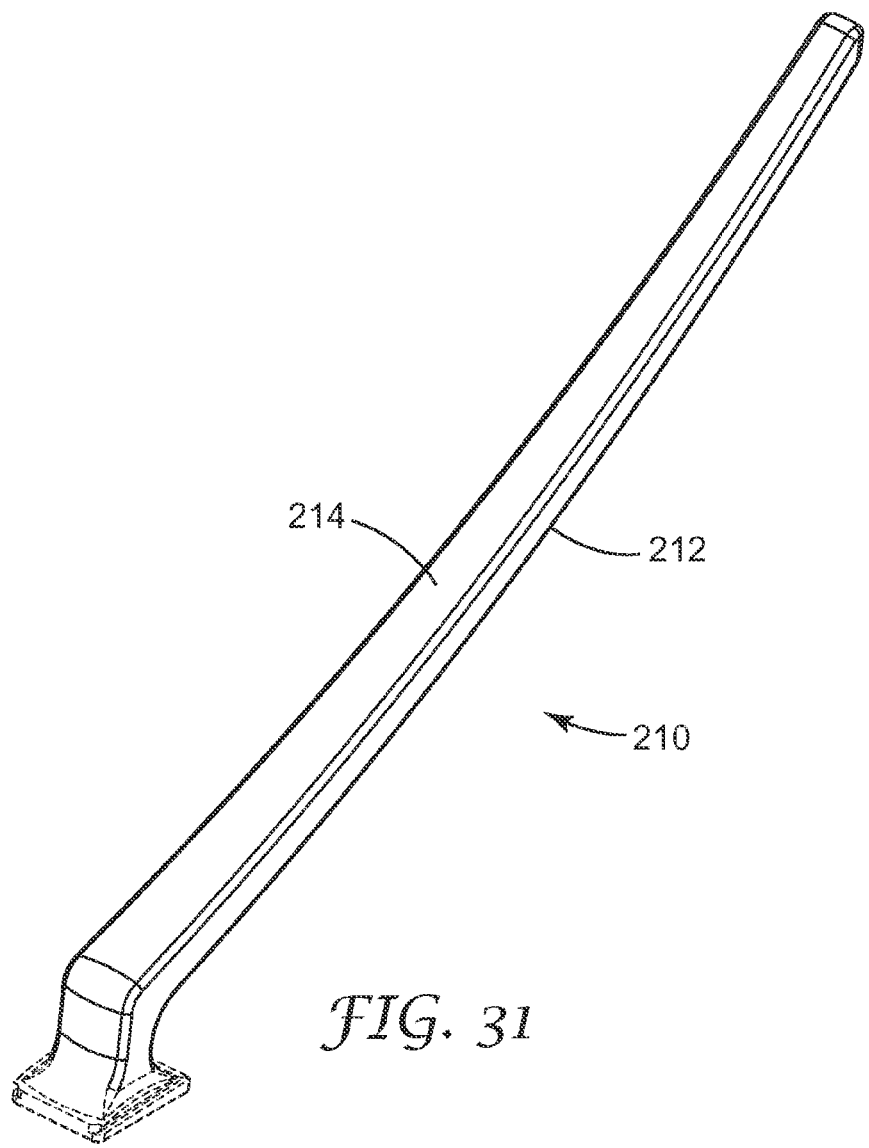
FIG. 31 is a top perspective view of an alternative embodiment of the handle shown in FIG. 1.
Figure 32:
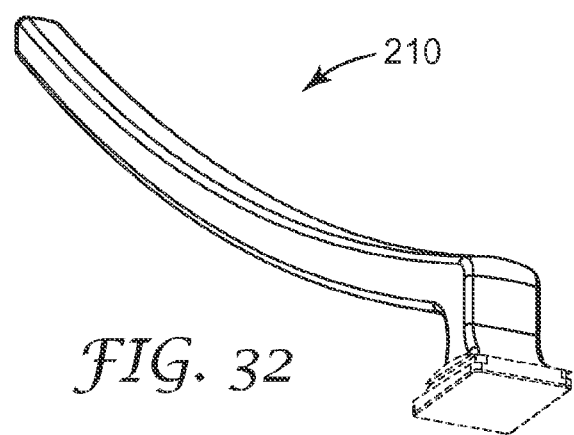
FIG. 32 is a bottom perspective view of an alternative embodiment of the handle shown in FIG. 31.
Figure 33:
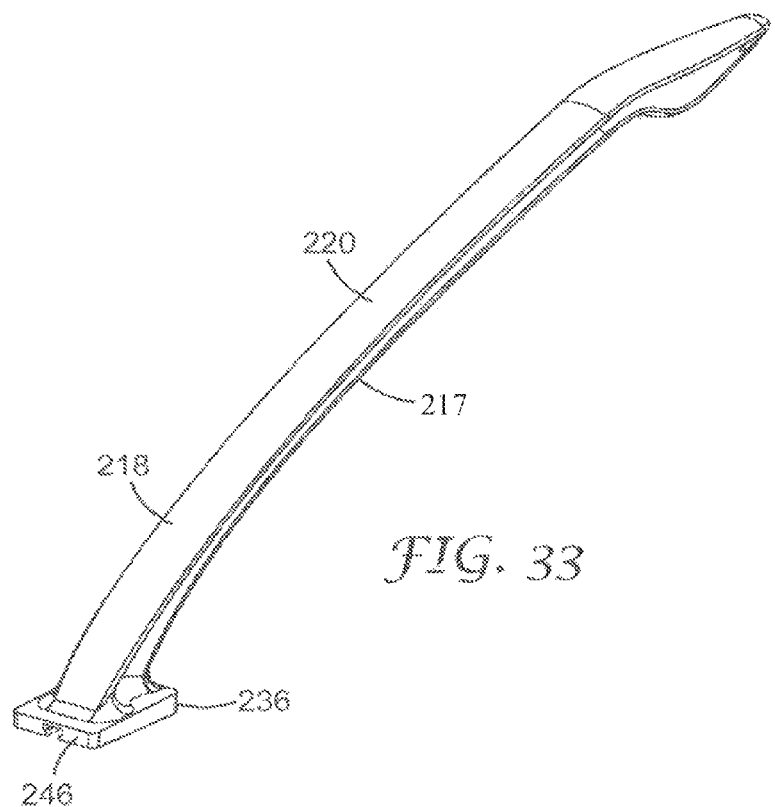
FIG. 33 is a top perspective view of an alternative embodiment of the handle shown in FIG. 1.

Referring to FIG. 24, an alternative embodiment to the pad support member 50 is shown. The handle is shown attached to a griddle cleaning pad member 220 that includes a plurality of adjacent pad members including members 221 and 222. The illustrated griddle cleaning pad member 220 is described in greater detail in Patent Application Ser. No. 60/743,456 titled Heated Food Preparation Cleaning Pad that was provisionally filed on the same date as the present application on behalf of 3M. The application is incorporated by reference herein.

Referring to FIGS. 25-33, four different handle designs are shown. Handle 180 is essentially identical to handle 20. The handle 180 includes a lower hand support 182 and an upper hand support 184. The surface of the supports 182 and 184 of handle 180 are constructed to provide some ergonomic advantages over straight shafted handles. The supports 182 and 184 are disposed at different angles than the center portion 186 of the handle 180. The handle 190 includes a generally curved profile. The upper hand support portion 192 is disposed at a less inclined angle relative to the center portion 196 of the handle 190. The lower hand support 194 can in some embodiments include a different material or different surface treatment than the center portion 196 of the handle 190. The handle 200 is similar to the handle 190, however the upper hand support member 202 includes a different structural arrangement. The upper hand support member 202 includes a plurality of stacked ring like members 204. The handle 210 has a profile that curves upwards. Some users may prefer gripping the handle 210 from the back side 212 rather than the front side 214. Handle 217 is similar to handle 20, however lower hand support area 218 is not at an offset angle relative to the middle portion 220 of the handle 217. Each of the handles is sized such that the user can clean the griddle without positioning oneself too close to the griddle.

Figure 34:
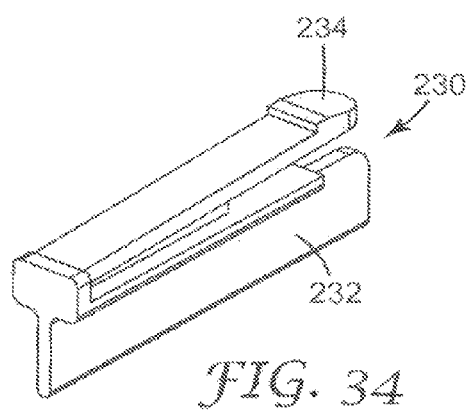
FIG. 34 is a perspective view of an alternative embodiment of the pad support element shown in FIG. 1.
Figure 35:
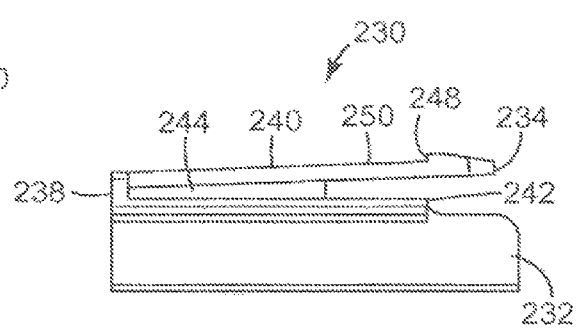
FIG. 35 is a side elevation view of the pad support element shown in FIG. 34.

Referring to FIGS. 34-35, an alternative embodiment of the pad support member is shown. The pad support member 230 includes a panel 232 for supporting cleaning pads and a locking member 234 that is constructed to engage the foot portion 236 of handle 216. The locking member 234 includes a front stop member 238, an upper engagement member 240 and lower engagement member 242, and an alignment feature 244 connecting the upper engagement member 240 to the lower engagement member 242. The pad support member 230 is configured to slide into contact with the foot 236 and lock in place when the front stop member 238 abuts the front 246 of the foot 236. The notch 248 of the tab 250 engages the back portion of the foot. In the depicted embodiment the tab 250 can be conveniently depressed because the web portion 244 is shorter than the upper engagement member 240 such that the web portion does not extend under the tab 250 to better enable the tab 240 to flex.

Figure 36:
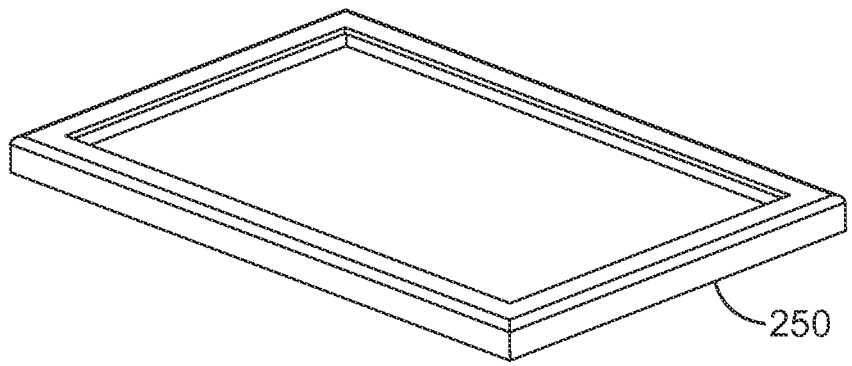
FIG. 36 is a top perspective view of a portion of the griddle cleaning tool in FIG. 24.
Figure 37:
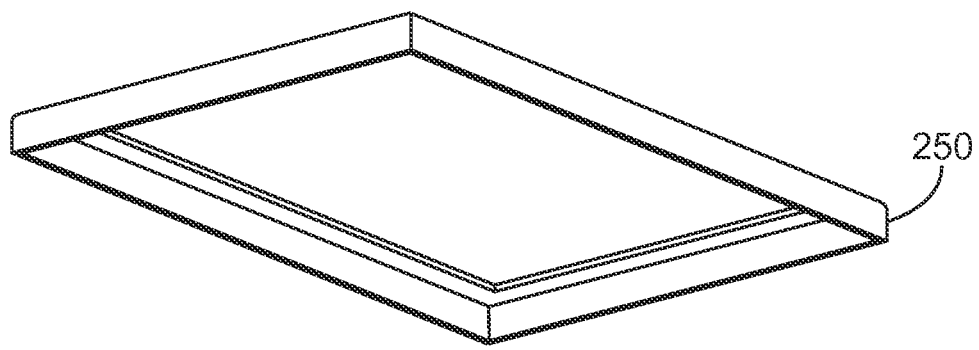
FIG. 37 is a bottom perspective view of a portion of the griddle cleaning tool in FIG. 24.
Figure 38:
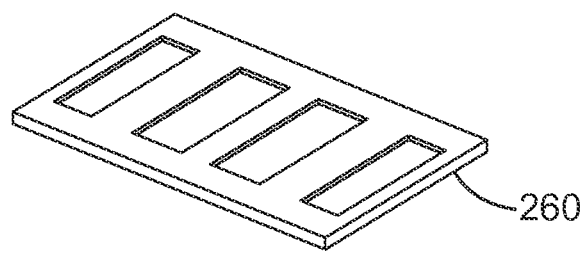
FIG. 38 is a top perspective view of an alternative embodiment of the portion of the griddle cleaning tool in FIG. 36.

Referring to FIGS. 36-38, a frame portion 250 of the pad 220 of FIG. 24 is shown in greater detail. An alternative embodiment of the frame portion 250 is also shown as frame 260. As discussed above these features and others are described in greater detail in Patent Application Ser. No. 60/743,456 titled Heated Food Preparation Surface Cleaning Pad, which has been incorporated by reference herein.

Referring to FIGS. 39-41, another embodiment of a cleaning tool 310 is shown. The depicted cleaning tool 310 includes a handle 320 and a removable attachment assembly 330. The removable attachment assembly 330 includes a shoe 302 that supports a plurality of pad supports 350, 352, 354, and 356. Each pad support 350, 352, 354, and 356 is constructed to support a disposable scrubbing pad 360 (shown in FIG. 41) and secure the pad 360 to the cleaning tool 310. The shoe 302 includes two parallel beams 396 that run along the front and rear edges of the shoe 302. The pad support members 350, 352, 354, and 356 are configured to engage the beams 396. In the depicted embodiment, the pad support members 350, 352, 354, and 356 are held parallel to each other, but are free to move along the rails 396 so that the tool 310 can adjust to work effectively and efficiently regardless of the particular spacing of the grooves on the grooved griddle. In the illustrated embodiment five pad support members are shown. However, it should be understood that the shoe 302 could be configured to any number of pad support members, including none.

The pad support member 350 in the depicted embodiment includes a front tab 351 and a rear tab 353 that engage the front and rear edges of the shoe 302. In the embodiment shown the tabs 351 and 353 are configured to be snap fitted to the shoe 302. More particularly, the tabs 351 and 353 extend outwardly over rails 396 on the front and rear edges of the shoe 302 during attachment and detachment of the support member 350 from the shoe 302. Referring to FIG. 41, a pad support member 350 is shown connected to a pad 360 without hooks. In the depicted embodiment, the pad 360 is connected to the pad support member via ultrasonic welding techniques described above. In the depicted embodiment, the pad support member 350 and pad 360 is replaced when the pad 360 is spent.

Figure 42:
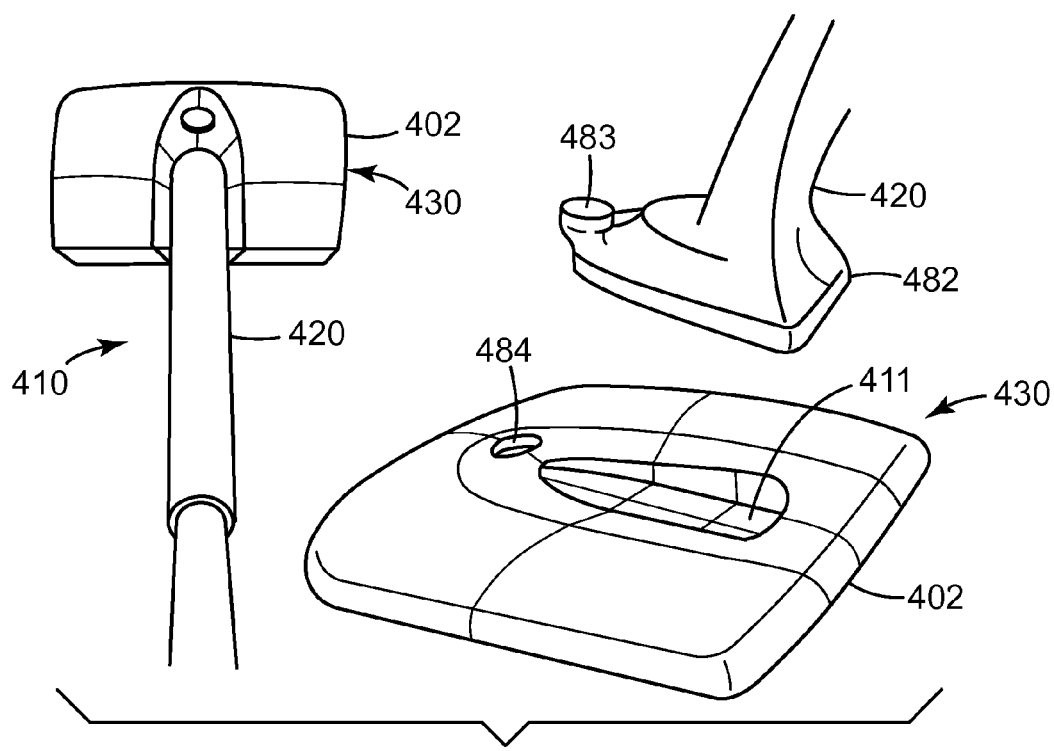
FIG. 42 is a top view and a partially exploded view of a griddle cleaning tool according to an alternative embodiment of the invention.
Figure 43:
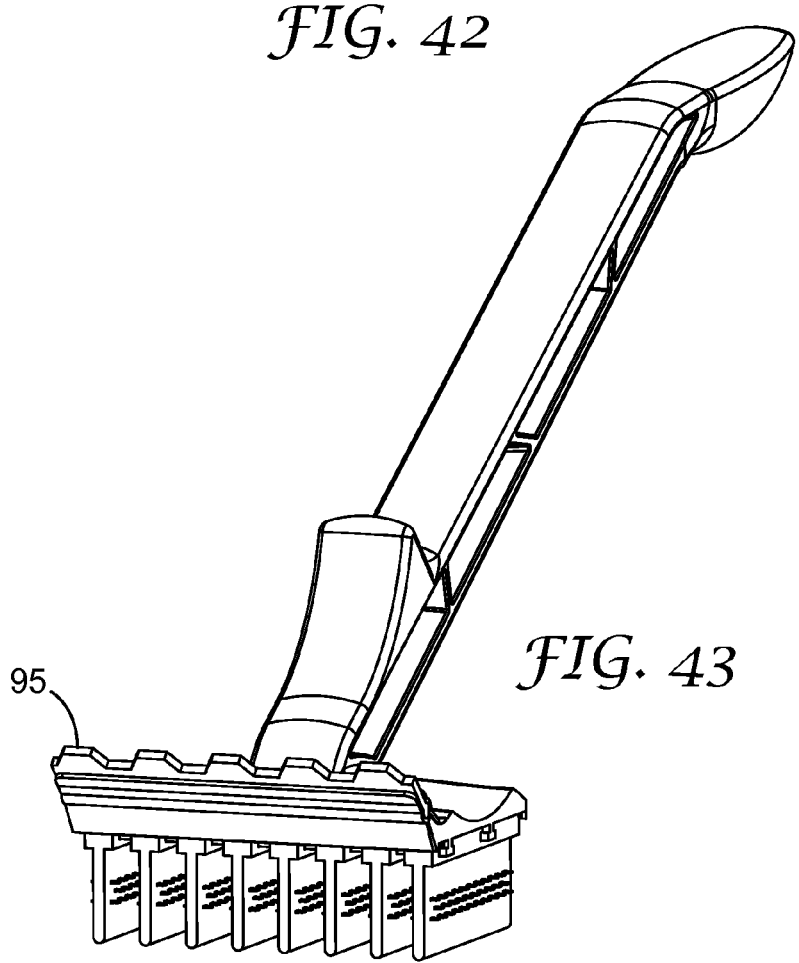
FIG. 43 is a perspective view of a griddle cleaning tool of FIG. 1 with a grooved squeegee.

Referring to FIG. 42, a top view and a partially exploded view of a griddle cleaning tool according to an alternative embodiment of the invention are shown. The depicted cleaning tool 410 includes a handle 420 and a removable attachment assembly 430. The removable attachment assembly 430 includes a shoe 402 that supports a plurality of pad supports and/or pads (not shown). The handle 420 includes a foot 482 that is constructed to mate with the shoe 402. The foot 482 shown includes a tab 483 that is sized to engage an aperture 484 on shoe 402. When the handle 420 and the shoe 402 are engaged, the foot 482 is received within the foot receiving cavity 411 of the shoe 402. To separate the foot 482 from the shoe 402, the tab 483 is depressed and the shoe 402 is slid away from the foot 482. The depicted embodiment is an example of an embodiment where the release tab is not at the rear (back side) of the shoe 402 and foot 482. In the depicted embodiment the tab 483 is located on the front side of the foot 482. It should be appreciated that release mechanisms in alternative embodiments may be located in other areas as well including, for example, on the top side surface of the shoe.

In some embodiments the griddle cleaning tool described above can be used in conjunction with a liquid or a solid chemical cleaner. For example, the griddle cleaning tool 10 can be used with 3M's commercially available Scotch-Brite Quick Clean Griddle Liquid, which is a griddle cleaning liquid intended for use on food contact surfaces, and is useful in loosening and lifting carbonized grease and food soil from hot griddle surfaces. In other embodiments the griddle cleaning tool 10 can be used with cleaning pads impregnated or otherwise attached to a chemical cleaner.

In one embodiment the griddle cleaning tool 10 is configured to be used with solid cleaners disclosed in 3M's March 2006 PCT filing titled Solid Cleaners For Heated Food Preparation Surface internal reference number 60681WO003 (WO2006/101866) which claims priority to Provisional Application Nos. 60/733,124 and 60/663,067. The entire PCT filing is incorporated by reference herein and portions of the application are included below.

The following disclosure is believed to be applicable generally to solid cleaners and the use of such solid cleaners on heated surfaces. Specifically, the disclosure is based around a solid cleaner that melts on a heated food preparation surface such as, for example, a grill surface, a griddle surface, or an oven surface. The heated surface can be formed of any material including, for example, metal, ceramic, glass, and/or plastic. The examples discussed above and the examples discussed below, provide an appreciation of the applicability of the disclosed cleaning systems, but should not be interpreted in a limiting sense.

A solid cleaner for heated surfaces is disclosed that includes one or more solidifying agents and one or more cleaning agents. The solid cleaner is solid at room temperature (e.g., 24 degrees Celsius) and a liquid at an elevated temperature. The elevated temperature can be any useful temperature at which the solid cleaner begins to melt (e.g., melting point.) The solid cleaner can have any useful melting point. In some embodiments, the solid cleaner has a melting point in a range from 35 to 150 degrees Celsius or from 35 to 100 degrees Celsius, or from 45 to 90 degrees Celsius, as desired. Solid cleaners that melt on heated surfaces provide one or more of the following advantages over liquid cleaners: increased dwell time; decreased cleaner evaporation; and/or the ability to be used on vertical heated surfaces. In many embodiments, the solid cleaners have an accelerated cleaning action at elevated temperatures (e.g., above 100 degrees centigrade.) In many embodiments, the solid cleaner is generally recognized as safe (GRAS) for food contact.

The solid cleaner can be any defined size or shape. In some embodiments, the solid cleaner has a cube shape, a cuboid shape, a pyramid shape, a cylinder shape, a cone shape, a sphere shape, or portions thereof. In some embodiments, the solid cleaner has a weight from 1 gram to 10 kilograms, or from 1 to 1000 grams, or from 5 to 500 grams, or from 10 to 200 grams. In other embodiments, the solid cleaner is a powder, pellet, flake, tablet, bar, and the like. The solid cleaner can be combined, or used in conjunction with other cleaning articles such as, for example a non-woven scouring pad, as described below, an abrasive coated woven web substrate griddle screen such as, for example SCOTCH-BRITE™ griddle screen number 200, or a pumice block, as desired.

The solid cleaner includes one or more solidifying agents that can assist in forming the solid cleaner. The term "solid" can be defined as a material having a definite volume and configuration independent of its container. Any useful solidifying agent can be used to form the solid cleaner. Any useful amount of solidifying agent can be used to assist in solidifying the solid cleaner. In many embodiments, the solidifying agent is inert or does not assist in the cleaning action of the solid cleaner. In many embodiments, the solidifying agent is generally recognized as safe (GRAS) for food contact. In certain embodiments, the solid cleaner does not need to be rinsed off of the cleaned surface, implying that it is a "no-rinse" cleaner and GRAS for food contact.

In many embodiments, the solidifying agent includes one or more waxes. The wax can be a natural wax or synthetic wax. In some embodiments where the solid cleaner includes wax, the solid cleaner is substantially insoluble in water up to at least 35 degrees Celsius. In some embodiments, the solidifying agent includes a natural wax such as, for example, a beeswax, a candelilla wax, a carnauba wax, a rice bran wax, a lemon peel wax, a soy wax, an orange peel wax, or mixtures thereof. In other embodiments, the solidifying agent includes a synthetic wax such as, for example, Baker-Hugnes (Petrolite) makes Bareco High Melt Microcrystalline waxes (melting point 82 to 93 degrees centigrade), Bareco Flexible Microcrystalline waxes (melting point 65 to 82 degrees centigrade), Starwax™, Victory™, Ultraflex™ and Be Square™ waxes, among others. EMS-Griltech (Switzerland) also makes synthetic low melting polymers such as copolyamide, and copolyesters. Synthetic waxes can also include PEG waxes that are solids such as PEG 1000 NF/FCC, fatty alcohols such as cetyl alcohol, and fatty esters such as propylene glycol monostearate, glycerol monolaurate, and sorbitan esters.

In some embodiments, the solidifying agent includes an emulsifying wax. The emulsifying wax can replace a portion of the one or more waxes, as desired. Emulsifying wax can include, for example, a blend of fatty acids (stearic, palmitic, oleic, capric, caprylic, myristic, and lauric), fatty alcohols (stearyl, cetyl) and/or fatty esters (polysorbates or TWEEN), and the like. In some embodiments, the emulsifying wax is a fatty alcohol such as, for example, stearic alcohol, cetyl alcohol, or mixtures thereof. One example of an emulsifying wax is Emulsifying Wax NF (cas#67762-27-0; 9005-67-8) and is a blend of cetearyl alcohol, polysorbate 60, PEG-150 stearate & steareth-20. If present, the emulsifying wax to other wax weight ratio can be from 1:1 to 1:5, or from 3:1 to 1:3, or from 2:1 to 1:2 as desired.

Wax can be included in the solid cleaner in any useful amount. In many embodiments, a solidifying amount of wax is included in the solid cleaner. In some embodiments, wax is present in the solid cleaner in a range from 10 to 80 wt %, or from 25 to 75 wt %, or from 30 to 50 wt %.

In some embodiments, the solidifying agent includes a one or more solid polyols. The term "polyol" refers to any organic molecule comprising at least two free hydroxyl groups. Polyols include polyoxyethylene derivatives such as, for example, glycol (diols), triols and monoalcohols, ester, or ethers thereof. Examples of polyols include solids glycols such as, for example, polyethylene glycols (PEG) under the tradename Carbowax series available from Dow Chemical, Midland Mich., polypropylene glycols (PPG) available from Dow Chemical, Midland, Mich., sorbitol and sugars, and solid polyesters such as, for example, poly(ε-caprolactone) under the tradename Tone series from Dow Chemical, Midland Mich., glycerol esters such as, for example, fatty acid mono ester. Fatty acid monoesters include but are not limited to propylene glycol monostearate, glycerol monolaurate, and glycerol monostearate. These esters are GRAS or approved as direct food additives.

Polyol can be included in the solid cleaner in any useful amount. In many embodiments, a solidifying amount of polyol is included in the solid cleaner. In some embodiments, polyol is present in the solid cleaner in a range from 10 to 80 wt %, or from 25 to 75 wt %, or from 30 to 50 wt %.

The solid cleaner includes one or more cleaning agents that can assist in the cleaning action of the solid cleaner. The cleaning agent can be any useful cleaning agent. The cleaning agent can be present in the solid cleaner in any useful amount. In many embodiments, the cleaning agents are generally recognized as safe (GRAS) for food contact.

Cleaning agents include, for example, surfactants, and pH modifiers. In many embodiments, a cleaning amount of cleaning agent is included in the solid cleaner. In many embodiments, the cleaning agent is capable of removing at least a portion of the soil or residue on the heating surface without mechanical scrubbing action. In illustrative embodiments, the cleaning agent is present in the solid cleaner in range from 1 to 90 wt %, or from 1 to 50 wt %, or from 5 to 30 wt %.

In some embodiments, the cleaning agent includes one or more pH modifiers. These pH modifiers include alkaline compounds such as, inorganic alkaline compounds including for example, hydroxides, silicates, phosphates, and carbonates; and organic alkaline compounds including for example, amines. In other embodiments, the pH modifier is an acidic compound such as, for example, citric acid and the like.

In some embodiments, the cleaning agent is a carbonate salt such as, for example, calcium carbonate, potassium carbonate, or sodium carbonate. In some embodiments, the carbonate salt includes potassium carbonate and sodium carbonate that is dissolved in water, forming carbonate ions. In other embodiments, the carbonate salt includes a bicarbonate salt such as, for example, sodium bicarbonate. In further embodiments, the cleaning agent includes a silicate salt such as, for example, sodium metasilicate.

The pH modifiers can be included in the solid cleaner in any useful amount. In many embodiments, the pH modifier is present in the solid cleaner in range from 0.1 to 80 wt %, or from 1 to 50 wt %, or from 5 to 30 wt %. In many embodiments, the solid cleaner has a pH in a range from 7 to 13.

In some embodiments, the cleaning agent includes one or more surfactants. These surfactants include, for example, natural surfactants, anionic surfactants, nonionic surfactants, and amphoteric surfactants. Natural surfactants include, but are not limited to, coconut-based soap solutions. Anionic surfactants include, but are not limited to, dodecyl benzene sulfonic acid and its salts, alkyl ether sulfates and salts thereof, olefin sulfonates, phosphate esters, soaps, sulfosuccinates, and alkylaryl sulfonates. Amphoteric surfactants include, but are not limited to, imidazoline derivatives, betaines, and amine oxides. These surfactants can be included in the solid cleaner in any useful amount. In many embodiments, the surfactant is present in the solid cleaner in range from 5 to 80 wt %, or from 5 to 50 wt %, or from 5 to 30 wt %. In many embodiments, the surfactant is food grade surfactant, approved for use as a direct food additive. Often, food grade surfactants are used so that the cleaning surface does not need to be rinsed.

In some embodiments, the cleaning agent includes carbonate salts such as, for example, sodium and/or potassium carbonate with an amount of surfactant less than 5 wt %, or less than 3 wt %, or less than 1 wt % based on the solid cleaner weight. In some embodiments, the cleaning agent includes carbonate salts such as, for example, sodium and/or potassium carbonate with an amount of a natural surfactant less than 5 wt %, or less than 3 wt %, or less than 1 wt % based on the solid cleaner weight.

The solid cleaner may optionally include one or more carriers. The carrier can be any amount of useful carrier that can provide solubility for any pH modifier and/or provide good food soil pick up and/or have sufficiently low viscosity upon heating and/or allows the solid cleaner to retain its shape at room temperature. In many embodiments, the carrier is generally recognized as safe (GRAS) for food contact. Carriers include, for example, water, glycerin, triethylene glycol, and diethylene glycol. In some embodiments, the carrier is present in the solid cleaner in range from 0 to 80 wt %, or from 1 to 60 wt %, or from 25 to 50 wt %.

In some embodiments, the carrier includes glycerin or glycerol. In certain embodiments, glycerin or glycerol can also act as a solubilizer of soils to be cleaned from the heated surfaces. When present, glycerin can make up from 1 to 80 wt %, or from 1 to 50 wt %, or from 5 to 40 wt %, or from 10 to 30 wt %. In some embodiments, the carrier includes water. When present, water can make up from 1 to 80 wt %, or from 1 to 50 wt %, or from 5 to 40 wt %, or from 10 to 30 wt %. In further embodiments, the carrier includes water and glycerin. When present, water and glycerin can make up from 1 to 80 wt %, or from 1 to 50 wt %, or from 5 to 40 wt %, or from 10 to 30 wt %.

Thickeners can be optionally included in the solid cleaner, as desired. In many embodiments, thickeners can replace a portion of the solidifying agent, as desired. Thickeners can include, for example, xanthan gum, guar gum, polyols, alginic acid, sodium alginate, propylene glycol, methyl cellulose, polymer gels, clay, gelatin/clay mixtures, gelatin/oxide nanocomposite gels, smectite clay, montmorillonite clay, fillers e.g. $CaCO_3$ and mixtures of therein. If present, thickeners can make up from 0.1 to 25 wt %, or from 0.5 to 10 wt %.

Abrasive material can be optionally included in the solid cleaner, as desired. In many embodiments, the abrasive materials incorporated into the solid cleaning composition can assist in the mechanical scrubbing action and can be used alone or in addition to an abrasive pad described herein. Abrasive materials include, for example, inorganic abrasive particles, organic based particles, sol gel particles or combinations thereof. Further examples of suitable abrasive particles are described in WO 97/49326.

Additives can be optionally includes in the solid cleaner, as desired. Additives can include, for example, builders, corrosion inhibitors (e.g., sodium benzoate), sequestering agents (EDTA), dyes, preservatives, and fragrances. In many embodiments, the additives are generally recognized as safe (GRAS) for food contact or approved for use as a direct food additive.

In some embodiments, a non-woven substrate can be combined with the solid cleaners disclosed herein. Non-woven substrates are suited for scouring heated surfaces and can assist in physical removal of food soils at least partially removed or softened by the solid cleaners disclosed herein. In many embodiments, non-woven substrates include non-woven webs of fibers.

In general, non-woven webs of fibers may be made of an air-laid, carded, stitch-bonded, thermobonded and/or resin-bonded construction of fibers, all as known by those skilled in the art. Fibers suitable for use in non-woven substrate materials include natural and synthetic fibers, and mixtures thereof. Synthetic fibers are preferred including those made of polyester (e.g., polyethylene terephthalate), nylon (e.g.; hexamethylene adipamide, polycaprolactam), polypropylene, acrylic (formed from a polymer of acrylonitrile), rayon, cellulose acetate, and so forth. Suitable natural fibers include those of cotton, wool, jute, and hemp. The fiber material can be a homogenous fiber or a composite fiber, such as bicomponent fiber (e.g., a co-spun sheath-core fiber). Non-woven substrate materials may also include different fibers in different portions. In some thermobonded non-woven substrate embodiments, the substrate includes melt bondable fibers where the fibers are bonded to one another by melted portions of the fibers.

In some embodiments, the non-woven substrate material is an open, low density, three-dimensional, non-woven web of fibers, the fibers bonded to one another at points of mutual contact, referred to in the following as a "lofty, nonwoven web material". In some embodiments, the fibers are thermo-bonded and/or resin-bonded (i.e. with a hardened resin, e.g. a prebond resin) to one another at points of mutual contact. In other embodiments, the fibers are resin-bonded to one another at points of mutual contact. Because the fibers of the web are bonded together at points of mutual contact, e.g. where they intersect and contact one another, a three-dimensional web structure of fibers is formed. The many interstices between adjacent fibers remain substantially unfilled, for example by resin, and thus an open web structure of low density having a network of many relatively large intercommunicated voids is provided. The term "open, low density" non-woven web of fibers is understood to refer to a non-woven web of fibers that exhibits a void volume (i.e. percentage of total volume of voids to total volume occupied by the non-woven web structure) of at least 75%, or at least 80%, or at least 85%, or in the range of from 85% to at least 95%. Such a lofty, non-woven web material is described in U.S. Pat. No. 2,958,593, which is incorporated by reference herein.

Another example of a lofty, non-woven web material is described by U.S. Pat. Nos. 2,958,593, and 4,227,350, which are incorporated by reference herein. These patents disclose a lofty, non-woven web formed from a continuous extrusion of nylon coil material having a diameter in a range from 100 micrometers to 3 mm. Inorganic and/or organic abrasive materials can be optionally included on these non-woven webs.

In some resin-bonded, lofty non-woven web material embodiments, the resin includes a coatable resinous adhesive such as a thermosetting water based phenolic resin, for example. Polyurethane resins may also be employed as well as other resins. Those skilled in the art will appreciate that the selection and amount of resin actually applied can depend on any of a variety of factors including, for example, fiber weight, fiber density, fiber type as well as the contemplated end use. Suitable synthetic fibers for production of such a web include those capable of withstanding the temperatures at which selected resins or adhesive binders are cured without deterioration.

In some lofty, non-woven web material embodiments, suitable fibers are between 20 and 110 mm, or between 40 and 65 mm, in length and have a fineness or linear density ranging from 1.5 to 500 denier, or from 1.5 to 100 denier. Fibers of mixed denier can also be used, as desired. In one embodiment, the non-woven substrate includes polyester or nylon fibers having linear densities within the range from 5 to 65 denier.

Lofty, non-woven web materials may be readily formed, e.g. air laid, for example, on a "Rando Webber" machine (commercially available from Rando Machine Company, New York) or may be formed by other conventional processes such as by carding or by continuous extrusion. Useful lofty, non-woven substrate materials have a fiber weight per unit area of at least 25 g/m$^2$, or at least 50 g/m$^2$, or between 50 and 1000 g/m$^2$, or between 75 and 500 g/m$^2$. Lesser amounts of fiber within the lofty, non-woven substrate materials will provide webs, which may be suitable in some applications.

The foregoing fiber weights will provide a useful non-woven substrate having a thickness from 5 to 200 mm, or between 6 to 75 mm, or between 10 and 30 mm. For phenolic prebond resins applied to a lofty, non-woven substrate having a fiber weight within the above ranges, the prebond resin is applied to the web or substrate in a relatively light coating, providing a dry add-on weight within the broad range from 50 to 500 g/m$^2$.

The foregoing lofty, non-woven substrate materials are effective for most scouring applications. For more intensive scouring applications, the lofty, non-woven substrate materials may be provided with abrasive particles dispersed and adhered there within. The abrasive particles can be adhered to the surfaces of the fibers in the lofty, non-woven substrate material. In many embodiments, the abrasive particles may include inorganic abrasive particles, organic based particles, sol gel particles or combinations thereof, all as known in the art. Examples of suitable abrasive particles as well as methods and binders for adhering abrasive particles onto the surfaces of the fibers are for example described in WO 97/49326.

In some embodiments, abrasive particles are adhered to the fibers of the non-woven substrate by a hardened organic resin binder such as, for example, a heat cured product of a thermosetting coatable resinous adhesive applied to the fibers of the non-woven substrate as a "binder precursor". As used herein, "binder precursor" refers to a coatable resinous adhesive material applied to the fibers of the non-woven substrate to secure abrasive particles thereto. "Binder" refers to the layer of hardened resin over the fibers of the nonwoven web formed by hardening the binder precursor. In some embodiments, the organic resins suitable for use as a binder precursor in the non-woven substrate are formed from an organic binder precursor in a flowable state. During the manufacture of the non-woven substrate, the binder precursor can be converted to a hardened binder or make coat. In some embodiments, the binder is in a solid, non-flowable state. In some embodiments, the binder is formed from a thermoplastic material. In other embodiments, the binder is formed from a material that is capable of being cross-linked. In some embodiments, a mixture of a thermoplastic binder and a cross-linked binder is also useful.

During the process to make the web or substrate, the binder precursor can be mixed with the foregoing abrasive particles to form an adhesive/abrasive slurry that may be applied to the fibers of the non-woven by any of a variety of known methods such as roll coating, knife coating, spray coating, and the like. The thus applied binder precursor is then exposed to the appropriate conditions to solidify the binder. For cross-linkable binder precursors, the binder precursor can be exposed to the appropriate energy source to initiate polymerization or curing and to form the hardened binder.

In some embodiments, the organic binder precursor is an organic material that is capable of being cross-linked. The binder precursors can be either a condensation curable resin or an addition polymerizable resin, among others. The addition polymerizable resins can be ethylenically unsaturated monomers and/or oligomers. Examples of useable cross-linkable materials include phenolic resins, bis-maleimide binders, vinyl ether resins, aminoplast resins having pendant alpha,beta-unsaturated carbonyl groups, urethane resins, epoxy resins, acrylate resins, arylated isocyanurate resins, urea-formaldehyde resins, melamine formaldehyde resins, phenyl formaldehyde, styrene butadiene resins, isocyanurate resins, acrylated urethane resins, acrylated epoxy resins, or mixtures thereof. The binder precursor suitable for use is a coatable, hardenable adhesive binder and may comprise one or more thermoplastic or, thermosetting resinous adhesives. Resinous adhesives suitable for use in the present invention include phenolic resins, aminoplast resins having pendant alpha,beta-unsaturated carbonyl groups, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins, fluorene-modified epoxy resins, and combinations thereof. Examples of these resins can be found in WO 97/49326. Catalysts and/or curing agents may be added to the binder precursor to initiate and/or accelerate the polymerization process. In many embodiments the substrate can withstand temperatures up to at least 200 degrees Celsius, (e.g., food preparation operating temperature.)

Commercially available non-woven substrate or web materials are available under the trade designation "Scotch-Brite™ General Purpose Scour Pad No. 96," "Scotch-Brite™ Heavy Duty Griddle Cleaner No. 82 (non-woven glass cloth)," "Scotch-Brite™ All Purpose Scour Pad No. 9488R," "Scotch-Brite™ Heavy Duty Scour Pad No. 86," all available from 3M Co. In other embodiments, the substrate is a Scotch-Brite™ Griddle Screen No. 68, a Scotch-Brite™ Griddle Screen No. 200, steel-wool, pumice block, foamed glass bricks, and the like.

EXAMPLES

All chemicals were used as commercially available.

| | |
|---|---|
| Quick Clean | Scotch-Brite ™ Quick Clean Griddle Liquid, No. 700, 3M Co., St. Paul, MN |
| FAME | Fatty Acid Mono Ester (Lauricidin ™), Med-Chem. Laboratories, Galena, IL |
| PEG | Poly(ethylene glycol) (1000 Da, 4600 Da, or 8000 Da), Aldrich, Milwaukee, WI. |
| Potassium Carbonate K$_2$CO$_3$ (anhydrous) | Ashta Chemicals, Ashtabula, OH. |
| Sodium Carbonate Na$_2$CO$_3$ (monohydrate) | J. T. Baker, Phillipsburg, NJ. |
| Stock Solution #1 | 10 g Potassium Carbonate/4 g Sodium Carbonate/20 g DI Water |
| Stock Solution #2 | 12 g Potassium Carbonate/6 g Sodium Carbonate/20 g DI Water |
| Stock Solution #3 | 10 g Potassium Carbonate/4 g Sodium Carbonate/15 g DI Water |
| Stock Solution #4 | 10 g Potassium Carbonate/4 g Sodium Carbonate/14 g DI Water |
| Glycerin | Merck KGaA, Darmstadt Germany |
| Tone Polyol 210 | Melting Point Range: 35° to 45° C., Dow/Union Carbide, Midland, MI |
| Tone Polyol 230 | Melting Point Range: 40° to 50° C., Dow/Union Carbide, Midland, MI |
| Tone Polyol 240 | Melting Point Range: 45° to 55° C., Dow/Union Carbide, Midland, MI |
| Tone Polyol 260 | Melting Point Range: 50° to 60° C., Dow/Union Carbide, Midland, MI |
| #46 Pad | Scotch-Brite ™ Griddle Polishing Pad No. 46, 3M Co., St. Paul, MN |
| #9488R Pad | Scotch-Brite ™ All Purpose Scouring Pad No. 9488R, 3M Co., St. Paul, MN |
| SPAN 40 | Sorbitan Monopalmitate Surfactant, Aldrich, Milwaukee, WI |
| SPAN 65 | Sorbitan Tristearate Surfactant, Imperial Chemical Industries (ICI), London, UK |
| Brij 35 | Dodecylpoly(ethylene glycol) ether surfactant, Uniquema (ICI), London, UK |
| Pluracare L44 NF | Block copolymer of poly(ethylene glycol) and poly(propylene glycol), BASF, Lundwigshafen, DE |
| BioSoft D-40 | Sodium Dodecylbenzene Sulphonate Surfactant, Stepan Company, Northfield, IL |
| EDTA | Ethylene Diamine Tetra Acetate - Sequesterant Eastman Kodak Co., Kingsport, TN |
| Xanthan Gum | R. T. Vanderbilt Company, Inc. Norwalk, CT. |
| Candelilla wax | Strahl & Pitsch, Inc., West Babylon, CT. |
| Sodium Metasilicate | J. T. Baker, Phillipsburg, NJ. |
| Sodium Bicarbonate | Mallinckrodt BaKER, Inc., Paris, KY |
| Melamine formaldehyde particles | Particle 40/100 mesh. Maxi-Blast, Inc., South Bend, IN. |
| Pumice 0 | Charles B. Chrystal Co., Inc. New York, NY |
| Pumice FF | Charles B. Chrystal Co., Inc. New York, NY |
| Emulsifying wax NF | Strahl & Pitsch, Inc., West Babylon, CT. |
| Cetyl Alcohol | TCI Mark |
| Stearyl Alcohol | Alfol 18 - Sasol North America Inc., Weslake, Louisiana. |

Test Methods for Cleaning the Griddle

Burnt Oil Test Method
1. Turn all three burners on the flat griddle (Star Mftg. Model 536-76A. Smithville Tenn.) to 450° F. (232° C.).
2. Measure about 40 mL of commercially available soybean oil (e.g., Crisco) and pour on the griddle.
3. Spread out oil with a 3M Green Scotch-Brite™ General Purpose Scour Pad No. 96 until even over entire surface of griddle.
4. Let griddle heat oil for 45 minutes. Oil should be dark brown and of fairly uniform color across the entire griddle.
5. Decrease the temperature of the griddle to 300-350° F. (150-175° C.).
6. Measure the temperature of the griddle with the IR thermometer (Dickson, Chicago, Ill.) and record it. It should be between 300-350° F. (150-175° C.).
7. Apply test cleaning composition on desired amount of griddle. 100 grams of test cleaning composition for the entire griddle.
8. Apply test cleaner over griddle surface with Scotch-Brite™ Griddle Polishing Pad No. 46 on pad holder and record the amount of time for the entire product to melt.
9. Turn off burner under section of griddle you are testing.
10. Immediately begin scrubbing using #46 pad and record amount of time necessary for acceptable level of cleanliness.
11. Scrape griddle surface with squeegee to move melted wax into grease trap.
12. Repeat cleaning over other surfaces of griddle with other test cleaners.
13. Using a wet paper towel on the pad holder, rinse surface and edges of griddle.
14. Apply a small amount of oil to surface of griddle and spread with Scotch-Brite™ General Purpose Scour Pad No. 96 to season the surface.
15. Wipe up any excess oil with a paper towel Ground Beef Test Method
1. Turn all three burners to 325° F. (160° C.).
2. Weigh 2.5 lbs (1.1 Kg) of ground beef for the entire griddle
3. Cook the beef until dark brown, moving the ground beef around the griddle to make it evenly distributed.
4. Remove the beef from the griddle with the flat cooking utensil taking off as much beef as possible.
5. Leave the food soil cooking for an extra 60 minutes
6. Measure the temperature of the griddle and record it. It should be between 300-350° F. (150-175° C.).
7. Apply test cleaner over desired amount of griddle. 100 g to 120 g of cleaning composition for the entire griddle.
8. Spread test cleaner over griddle surface with an appropriate pad (either 3M #46 Griddle Polishing Pad or 3M #9488R All Purpose Pad) on pad holder and record the amount of time for the entire product to melt.
9. Turn off burner under section of griddle you are testing.
10. Immediately begin scrubbing using the No. 46 pad and record amount of time necessary for acceptable level of cleanliness.
11. Scrape griddle surface with squeegee
12. Repeat cleaning over the entire surfaces of griddle with other test cleaners.
13. Using a wet paper towel on the pad holder, rinse surface and edges of griddle.
14. Wash out drip tray of any remaining food soil.
15. Apply a small amount of oil to surface of griddle and spread with Scotch-Brite™ General Purpose Scour Pad No. 96 to season to surface.
16. Wipe up any excess oil with a paper towel.

Preparation of the Cleaning Compositions

Stock solutions were made by dissolving the salts indicated below in de-ionized water at low heat. The solution was stirred until no more solid salts were present.

The stock solutions and glycerin (Procter & Gamble, Cincinnati, Ohio) were added to a beaker and placed on a hot plate/stirrer. The solution was heated to about 80° C. while gently mixing. The solidifying agent (wax or polyol) was added to the stock solution/glycerin mix and heated while stirring until the solidifying agent was completely melted. The formulation was taken off the heat once it was well mixed and homogenous.

Tablets and impregnated pads were made by either pouring into the molds to form tablets or pads. Tablets were made by allowing the melted formulations to cool down to room temperature in an aluminum mold of 2"×2"×1" (W×L×H). Tablets of 60 g each were made with this mold. Impregnated pads (#46) were also made by pouring the melted formulation on a mold of 4"×5"×1" (W×L×H) at about 80° C., allowing it to cool down to about 60° C. and then placing the pad onto the mold and applying a little pressure to force the pad into the solidified cleaner. The pads were allowed to cool to room temperature.

Formulations were also made of the following waxes:
Rice bran wax (Koster Keunen, Inc., Watertown, Conn., USA)
Lemon peel Wax (Koster Keunen, Inc., Watertown, Conn., USA)
Soy wax flakes (Koster Keunen, Inc., Watertown, Conn., USA)
Deodorized orange peel wax (Koster Keunen, Inc., Watertown, Conn., USA)
Beeswax (Strahl & Pitsch, Inc., West Babylon, N.J., USA)
Candelilla wax (Strahl & Pitsch, Inc., West Babylon, N.J., USA)
Carnauba wax (Strahl & Pitsch, Inc., West Babylon, N.J., USA)

Formulation 1
A solid cleaner was made by combining 34 g of stock solution #1 with 22 g of glycerin and 44 g of beeswax.

Formulation 2
A solid cleaner was made by combining 34 g of stock solution #1 with 22 g of glycerin and 44 g of carnauba wax.

Formulation 3
A solid cleaner was made by combining 34 g of stock solution #1 with 22 g of glycerin and 44 g of candelilla wax.

Formulation 4
A solid cleaner was made by combining 34 g of stock solution #1 with 33 g of glycerin and 33 g of beeswax.

Formulation 5
A solid cleaner was made by combining 34 g of stock solution #1 with 33 g of glycerin and 33 g of carnauba wax.

Formulation 6
A solid cleaner was made by combining 34 g of stock solution #1 with 40 g of glycerin and 26 g of carnauba wax.

Formulation 7
A solid cleaner was made by combining 34 g of stock solution #1 with 40 g of glycerin and 26 g of candelilla wax.

Formulation 8
A solid cleaner was made by combining 34 g of stock solution #2 with 40 g of glycerin and 26 g of candelilla wax.

Formulation 9
A solid cleaner was made by combining 34 g of stock solution #2 with 40 g of glycerin and 26 g of candelilla wax impregnated into a pad.

Formulation 10
A solid cleaner was made by combining 34 g of stock solution #2 with 40 g of glycerin and 26 g of beeswax impregnated into a pad.

Formulation 11
A solid cleaner was made by combining 34 g of stock solution #2 with 40 g of glycerin and 26 g of carnauba wax impregnated into a pad.

Formulation 12
A solid cleaner was made by combining 34 g of stock solution #2 with 40 g of glycerin and 26 g of lemon peel wax.

Formulation 13
A solid cleaner was made by combining 24 g of stock solution #2 with 40 g of glycerin and 26 g of carnauba wax and 10 g of sodium bicarbonate.

Formulation 14
A solid cleaner was made by combining 24 g of stock solution #2 with 40 g of glycerin and 26 g of carnauba wax and 10 g of sodium metasilicate.

Formulation 15
A solid cleaner was made by combining 34 g of stock solution #2 with 40 g of glycerin and 26 g of rice wax.

Formulation 16
A solid cleaner was made by combining 34 g of stock solution #2 with 40 g of glycerin and 26 g of orange peel wax.

Results

Experimental samples were compared against Scotch-Brite™ Quick Clean Griddle Liquid No. 700 (Quick Clean or 700) (3M Company, St. Paul, Minn.) and rated for melting time (in seconds), and cleaning performance. A visual rating was given for cleaning performance. The rating scale went from 1 to 5, with 5 being no food residue left on the heated surface. The temperature of the griddle was recorded with an IR thermometer.

A comparison of the performance of the different experimental formulations against Quick Clean is shown in the table below.

Griddle Cleaner Evaluation

| Example | Formulation | Soil | Griddle Temperature (° F.) | Melting Time (sec) | Cleaning Performance |
|---|---|---|---|---|---|
| 1 | 1 | Oil | | | 3 |
| 2 | 2 | Oil | | | 3 |
| 3 | 3 | Oil | | | 3 |
| 4 | 4 | Oil | 330 | 38 | 3 |
| 5 | 5 | Oil | 325 | 45 | 3 |
| 6 | 6 | Oil | 300 | 42 | 3 |
| 7 | Quick Clean | Oil | 330 | N/A | 5 |
| 8 | 7 | Oil | 330 | 40 | 3 |
| 9 | 8 | Oil | 325 | 42 | 5 |
| 10 | 9 | Oil | 330 | | 5 |
| 11 | 9 | Oil | 325 | 110 | 5 |
| 12 | 10 | Oil | 335 | 40 | 5 |
| 13 | 11 | Oil | 325 | 30 | 3 |
| 14 | 8 | Beef | 350 | 85 | 5 |
| 15 | 8 | Beef | 350 | 120 | 5 |
| 16 | 8 | Beef | 360 | 19 | 5 |
| 17 | 8 | Beef | 360 | 67 | 5 |
| 18 | Quick Clean | Beef | 340 | N/A | 5 |
| 19 | 11 | Oil | 350 | 45 | 5 |
| 20 | 12 | Oil | 340 | 54 | 5 |
| 21 | 15 | Oil | 330 | 38 | 5 |
| 22 | 16 | Oil | 325 | 32 | 3 |

Further Prepared and Tested Samples:

The following formulations were made up using Quick Clean, FAME, PEG 1000, 4600 and 8000 as well as Stock Solutions #1 and #3.

| | | Compositions in % wt | | | | |
|---|---|---|---|---|---|---|
| | | | PEG | | Stock Solution | |
| Example # | FAME | 1000 | 4600 | 8000 | #1 | #3 |
| Quick Clean (1) | | | | | | |
| 23 | 16 | | 50 | | | 34 |
| 24 | 16 | | | 50 | | 34 |
| 25 | 36 | 30 | | | | 34 |
| 26 | 36 | | | | | 34 |
| 27 | 36 | | 30 | 60 | | 34 |
| 28 | 50 | 16 | | | | 34 |
| 29 | 50 | | 16 | | 34 | |
| 30 | 50 | | 16 | | | 34 |
| 31 | 50 | | | 16 | | 34 |

The following formulations were made up using Glycerin, Tone Polyols (210, 230, 240 and 260), Stock Solution #3. In addition, Example #42 and #43 were loaded into a Scotch-Brite™ Griddle Polishing Pad No. 46.

| | | Composition in % wt | | | | | | |
|---|---|---|---|---|---|---|---|---|
| | | Difunctional Tone Polyol | | | | Stock solution | | Loaded |
| Example # | Glycerin | 210 | 230 | 240 | 260 | #1 | #3 | Pad |
| 32 | 13 | 69 | | | | | 18 | NO |
| 33 | 13 | | 69 | | | | 18 | NO |
| 34 | 13 | | | | | | 18 | NO |
| 35 | 13 | | | | 69 | | 18 | NO |
| 36 | 13 | 69 | | | | | 18 | YES |
| 37 | 13 | | | | 69 | | 18 | YES |

The following formulations were made up using Glycerin, Tone Polyols (210 and 260), SPAN 40, SPAN 65, Quick Clean and Stock Solutions #3 and #4.

| | | Composition in % wt | | | | | | |
|---|---|---|---|---|---|---|---|---|
| | | Difunctional Tone Polyol | | Surfactant | | | Stock Solution | |
| Example # | Glycerin | 210 | 260 | SPAN 40 | SPAN 65 | Quick Clean | #3 | #4 |
| 38 | 13 | | 61 | 10 | | | 16 | |
| 39 | 13 | | 61 | | 10 | | 16 | |
| 40 | | | 77 | | | 23 | | |
| 41 | 13 | 41 | 33 | | | | 13 | |
| 42 | 13 | 67 | | | | | | 20 |
| 43 | 13 | | 68 | | | | | 19 |

The following formulations were made up using Glycerin, Tone Polyols (210 and 260), SPAN 40, Brij 35, Pluracare L44 NF, BioSoft D-40, PEG 1000, and Stock Solution #3.

| | | Composition in % wt | | | | | | | |
|---|---|---|---|---|---|---|---|---|---|
| | | Difunctional Tone Polyol | | Surfactants/Detergents | | | | | Stock |
| Example # | Glycerin | 210 | 260 | Span 40 | Brij 35 | Pluracare L44 NF | BioSoft D-40 | PEG 1000 | Sol. #3 |
| 44 | 14 | 68 | | | 0.05 | | | | 18 |
| 45 | 14 | 68 | | | | | 0.2 | | 18 |
| 46 | 13 | 69 | | | | 0.05 | | | 17 |
| 47 | 14 | 58 | | | | | | 10 | 16 |
| 48 | 11 | | 66 | | | | | 8 | 14 |
| 49 | 14 | 67 | | 1 | | | | | 18 |
| 50 | 14 | | 67 | 1 | | | | | 18 |

The following formulations were made up using Quick Clean, Glycerin, Tone Polyols (210 and 260), SPAN 40, EDTA, and Stock Solution #2.

| Example # | Stock Solution #2 (g) | Glycerin (g) | Candelilla Wax (g) | Xanthan Gum (g) | ratio Gly/Wax | Melting time (sec) | Cleaning performance |
|---|---|---|---|---|---|---|---|
| 54 | 42.7 | 41.0 | 16.3 | 0.0 | 2.5 | 45 | 5 |
| 55 | 42.2 | 40.4 | 16.1 | 1.2 | 2.5 | 50 | 5 |
| 56 | 40.2 | 38.5 | 15.4 | 5.9 | 2.5 | 40 | 5 |
| 57 | 39.3 | 37.6 | 15.0 | 8.1 | 2.5 | 40 | 1 |
| 58 | 50.0 | 29.4 | 19.1 | 1.5 | 1.5 | 38 | 4 |
| 59 | 47.2 | 27.8 | 18.1 | 6.9 | 1.5 | 36 | 1 |
| Formulation 9 | 34.0 | 40.0 | 26.0 | 0.0 | 1.5 | 45 | 5 |

Composition in % wt

| Example # | Glycerin | Difunctional Tone Polyol 210 | Difunctional Tone Polyol 260 | Surfactant SPAN 40 | Sequester EDTA | Stock Sol. #3 |
|---|---|---|---|---|---|---|
| 51 | 14 |  | 66 |  | 3 | 17 |
| 52 | 14 | 67 |  | 0.05 | 3 | 17 |
| 53 | 13 | 71 |  | 0.05 | 1 | 15 |

The following griddle cleaner formulations were made using Stock Solution #2, Glycerin, Candelilla Wax, and Xanthan Gum. The stock solution and glycerin were added to a beaker and placed on a hot plate/stirrer. The solution was heated to about 100° C. while gently mixing. The wax was added to the stock solution/glycerin mix and left in the heat while stirring until the wax was completely melted. Xanthan gum was added to the formulations at 100° C. after the wax was melted. The formulation was taken off the heat once it was well mixed and homogeneous.

Tablets and impregnated pads were made by either pouring into the molds to form tablets or pads. Tablets were made by allowing the melted formulation to cool down to room temperature in an aluminum mold of 2"×2"×1" (W×L×H). Tablets of 50 g each were made with this mold. Impregnated pads (#46) were also made by pouring the melted formulation on a mold of 4"×5.5"×1" (W×L×H) at about 80° C., allowing it to cool down to about 60° C. and then placing the pad and applying a little pressure. Pads of 100 g each were allowed to cool to room temperature.

| Example # | Stock Solution #2 (g) | Glycerin (g) | Candelilla Wax (g) | Xanthan Gum (g) |
|---|---|---|---|---|
| 54 | 42.7 | 41.0 | 16.3 | 0.0 |
| 55 | 42.2 | 40.4 | 16.1 | 1.2 |
| 56 | 40.2 | 38.5 | 15.4 | 5.9 |
| 57 | 39.3 | 37.6 | 15.0 | 8.1 |
| 58 | 50.0 | 29.4 | 19.1 | 1.5 |
| 59 | 47.2 | 27.8 | 18.1 | 6.9 |
| Formulation 9 | 34.0 | 40.0 | 26.0 | 0.0 |

Performance of these examples were compared to the control sample Formulation 9 (solid cleaner with no xanthan gum). Formulations were rated for cleaning performance. A visual rating was given for each of these qualitative attributes listed above. The rating scale went from 1 to 5, with 5 being best.

Results appear to indicate that formulations containing xanthan gum up to 6% were solid even when the amount of candelilla wax was significantly reduced from 26 g to 15-16 g. Examples 55 and 56 appear to show performance comparable to that of the control sample Formulation 9 (formulation with no thickener and higher wax content).

A variety of abrasive materials were added to Formulation 9 to form the Examples listed in the table below. The examples including abrasive materials were loaded onto the non-abrasive #9488R pad, while the Formulation 9 and the quick clean example was loaded onto an abrasive #46 pad. Tablets and impregnated pads were made by either pouring into the molds to form tablets or pads. Tablets were made by allowing the melted formulation to cool down to room temperature in an aluminum mold of 2"×2"×1" (W×L×H). Tablets of 50 g each were made with this mold. Impregnated pads were also made by pouring the melted formulation on a mold of 4"×5.5"×1" (W×L×H) at about 80° C., allowing it to cool down to about 60° C. and then placing the pad and applying a little pressure. Pads of 100 g each were allowed to cool to room temperature.

Performance of these examples were compared to the control sample Formulation 9 (solid cleaner with no abrasive) and to Quick Clean. Formulations were rated for cleaning performance. A visual rating was given for each of these qualitative attributes listed above. The rating scale went from 1 to 5, with 5 being best.

| Example # | Abrasive | Grams of Abrasive/100 g of Wax | Soil | Cleaning performance |
|---|---|---|---|---|
| 60 | Sodium Bicarbonate | 10 | Oil | 1 |
| 61 | Sodium Bicarbonate | 20 | Oil | 5 |
| 62 | Sodium Metasilicate | 10 | Oil | 1 |
| 63 | Sodium Metasilicate | 20 | Oil | 1 |
| 64 | Pumice 0 | 10 | Oil | 3 |
| 65 | Pumice 0 | 20 | Oil | 4 |
| 66 | Pumice 0 | 30 | Oil | 1 |
| 67 | Pumice 0 | 50 | Oil | 1 |
| 68 | Pumice FF | 10 | Oil | 3 |
| 69 | Pumice FF | 20 | Oil | 4 |
| 70 | Pumice 0 | 10 | Beef | 5 |
| 71 | Pumice FF | 10 | Beef | 5 |
| 72 | Melamine Resin | 10 | Oil | 5 |
| 73 | Melamine Resin | 20 | Oil | 5 |
| 74 | Melamine Resin | 30 | Oil | 5 |

| Example # | Abrasive | Grams of Abrasive/100 g of Wax | Soil | Cleaning performance |
|---|---|---|---|---|
| Formulation 9 | — | — | Oil | 5 |
| Quick Clean | — | — | Oil | 5 |
| Formulation 9 | — | — | Beef | 5 |
| Quick Clean | — | — | Beef | 5 |

These results appear to indicate that the performance of abrasive containing formulations was the same or better than the Quick Clean and control sample Formulation 9.

Emulsifying Wax NF was added to Formulation 9 to form the Examples listed in the table below. Tablets and impregnated pads were made by either pouring into the molds to form tablets or pads. Tablets were made by allowing the melted formulation to cool down to room temperature in an aluminum mold of 2"×2"×1" (W×L×H). Tablets of 50 g each were made with this mold. Impregnated pads (#46) were also made by pouring the melted formulation on a mold of 4"×5.5"×1" (W×L×H) at about 80° C., allowing it to cool down to about 60° C. and then placing the pad and applying a little pressure. Pads of 100 g each were allowed to cool to room temperature.

Performance of these examples were compared to the control sample Formulation 9 (solid cleaner with no emulsifying wax). Formulations were rated for cleaning performance. A visual rating was given for each of these qualitative attributes listed above. The rating scale went from 1 to 5, with 5 being best.

| Example # | Stock Solution #2 (g) | Glycerin (g) | Candelilla Wax (g) | Emulsifying Wax NF (g) | ratio Cand/Emul | Melting time (sec) | Cleaning performance |
|---|---|---|---|---|---|---|---|
| 75 | 34 | 40 | 13 | 13 | 1:1 | 25 | 5 |
| 76 | 34 | 40 | 9 | 17 | 1:2 | 30 | 5 |
| 77 | 34 | 40 | 17 | 9 | 2:1 | 30 | 5 |
| 78 | 34 | 40 | 20 | 6 | 3:1 | 35 | 5 |
| Formulation 9 | 34 | 40 | 26 | 0 | 0 | 45 | 5 |
| 79 | 34 | 30 | 13 | 13 | 1:1 | 30 | 5 |
| 80 | 34 | 25 | 13 | 13 | 1:1 | 25 | 5 |
| 81 | 34 | 20 | 13 | 13 | 1:1 | 25 | 5 |

These results appear to indicate that formulations that contain Emulsifying Wax NF melt faster than the control sample formulation 9. In addition, formulations that contain Emulsifying Wax NF were reported to have less "drag" when applied to the heated surface than the control sample formulation 9.

The following formulations were made up using stock solution #2, glycerin, wax and an emulsifying wax (cetyl and/or stearyl alcohol).

| Example # | Stock Solution #2 (g) | Glycerin (g) | Candelilla Wax (g) | Carnauba Wax (g) | Cetyl Alcohol (g) | Stearyl Alcohol (g) | Melting time (sec) | Cleaning performance |
|---|---|---|---|---|---|---|---|---|
| 82 | 34 | 40 | 13 | 0 | 0 | 13 | 38 | 5 |
| 83 | 34 | 40 | 13 | 0 | 13 | 0 | 35 | 5 |
| 84 | 34 | 40 | 13 | 0 | 6.5 | 6.5 | 38 | 5 |
| 85 | 34 | 40 | 0 | 13 | 0 | 13 | 48 | 5 |
| 86 | 34 | 30 | 0 | 13 | 0 | 13 | 33 | 5 |

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of this disclosure, and it should be understood that this disclosure is not limited to the illustrative embodiments set forth herein. Accordingly, the disclosure is to be limited only by the claims provided below.

The above specification provides a description of the manufacture and use of the composition of the invention. Since many embodiments of the invention can be made without departing from the spirit and scope of the invention, the invention resides in the claims hereinafter appended.

We claim:

1. A griddle cleaning tool comprising:
a handle including a first hand support portion and a foot;
a shoe constructed to removably engage the foot and support a disposable scrubbing pad; and
a plurality of pad support members,
wherein the shoe includes a bottom surface configured to slidably capture the plurality of pad support members, wherein the pad support members are movable relative to the shoe, wherein each of the pad support members is configured to support a scrubbing pad, and wherein the handle and the shoe are constructed of different materials, and the handle is constructed of a less heat resistant material than the shoe.

2. The tool according to claim 1, wherein the bottom surface of the shoe includes a pair of parallel rails configured to slidably engage with a corresponding pair of cutouts formed by each of the plurality of pad support members and position the pad support members in a parallel arrangement.

3. A cleaning accessory comprising:
a panel, the panel including an upper spine, a lower edge, a first primary surface, and an opposed second primary surface, wherein the upper spine is configured to be secured to a handle, and wherein a plurality of hooks project from each of the first and second primary surfaces; and a non-woven substrate attached to the first and second primary surfaces via the hooks, the non-woven substrate extending around the lower edge.

* * * * *